United States Patent
Akiyama et al.

[11] Patent Number: 6,021,024
[45] Date of Patent: Feb. 1, 2000

[54] MAGNETIC DISK DRIVE HAVING A CONSTANT SKEW ANGLE

[75] Inventors: Junichi Akiyama, Kawasaki; Tetsuo Inoue, Ichikawa; Keiko Higashi; Yasuo Ohtsubo, both of Yokohama; Kazushi Tanimoto, Tokyo, all of Japan

[73] Assignee: Kabushiki Kaisha Toshiba, Kawasaki, Japan

[21] Appl. No.: 08/292,214

[22] Filed: Aug. 19, 1994

Related U.S. Application Data

[63] Continuation-in-part of application No. 08/019,875, Feb. 19, 1993, abandoned.

[30] Foreign Application Priority Data

Feb. 21, 1992 [JP] Japan ......................................... 4-34952
Aug. 19, 1993 [JP] Japan ...................................... 5-204993
Aug. 19, 1993 [JP] Japan ...................................... 5-204994

[51] Int. Cl.$^7$ ................................. G11B 5/55; G11B 5/60
[52] U.S. Cl. ............................ 360/106; 360/103; 360/104
[58] Field of Search ............................. 360/97.01, 98.01, 360/103–106, 113, 125, 126

[56] References Cited

U.S. PATENT DOCUMENTS

| | | | |
|---|---|---|---|
| 4,896,233 | 1/1990 | Yamada | 360/104 |
| 4,926,275 | 5/1990 | Kuno et al. | 360/104 |
| 5,029,030 | 7/1991 | Luecke | 360/106 |
| 5,086,360 | 2/1992 | Smith et al. | 360/103 |
| 5,116,719 | 5/1992 | Gau | 360/126 |
| 5,168,409 | 12/1992 | Koyama et al. | 360/113 |
| 5,225,953 | 7/1993 | Wada et al. | 360/126 |
| 5,227,212 | 7/1993 | Ahlert et al. | 360/113 |
| 5,260,846 | 11/1993 | Iriko et al. | 360/106 |
| 5,267,109 | 11/1993 | Chapin et al. | 360/103 |
| 5,309,303 | 5/1994 | Hsia et al. | 360/103 |

FOREIGN PATENT DOCUMENTS

| | | |
|---|---|---|
| 63-52383 | 3/1988 | Japan . |
| 5-174527 | 7/1993 | Japan . |

*Primary Examiner*—Jefferson Evans
*Attorney, Agent, or Firm*—Oblon, Spivak, McClelland, Maier & Neustadt, P.C.

[57] ABSTRACT

A magnetic disk drive for carrying out reading/writing of information to/from a magnetic disk having a plurality of tracks including an innermost circumference track and an outermost circumference track. The disk drive includes a rotary actuator and a magnetic head mounted on a magnetic head slider which has separate writing and reading elements. The elements have a magnetic gap for reading and writing the information on a magnetic disk. A rotary actuator arm has one end connected to a rotary actuator and the other end connected to the magnetic head slider. The head slider has an inflow end and an outflow end for the fluid flow generated by the rotation of the disk and at least one bearing which generates a dynamic pressure by the fluid flow. The head is provided close to the outflow. A skew angle created between the magnetic gap length direction and the rotating direction of the disk is substantially constant between the innermost and the outermost tracks. The bearing is arranged at a given angle with respect to the rotating direction so that the outflow end is located on the outer circumferential side of the magnetic disk from the inflow end.

14 Claims, 16 Drawing Sheets

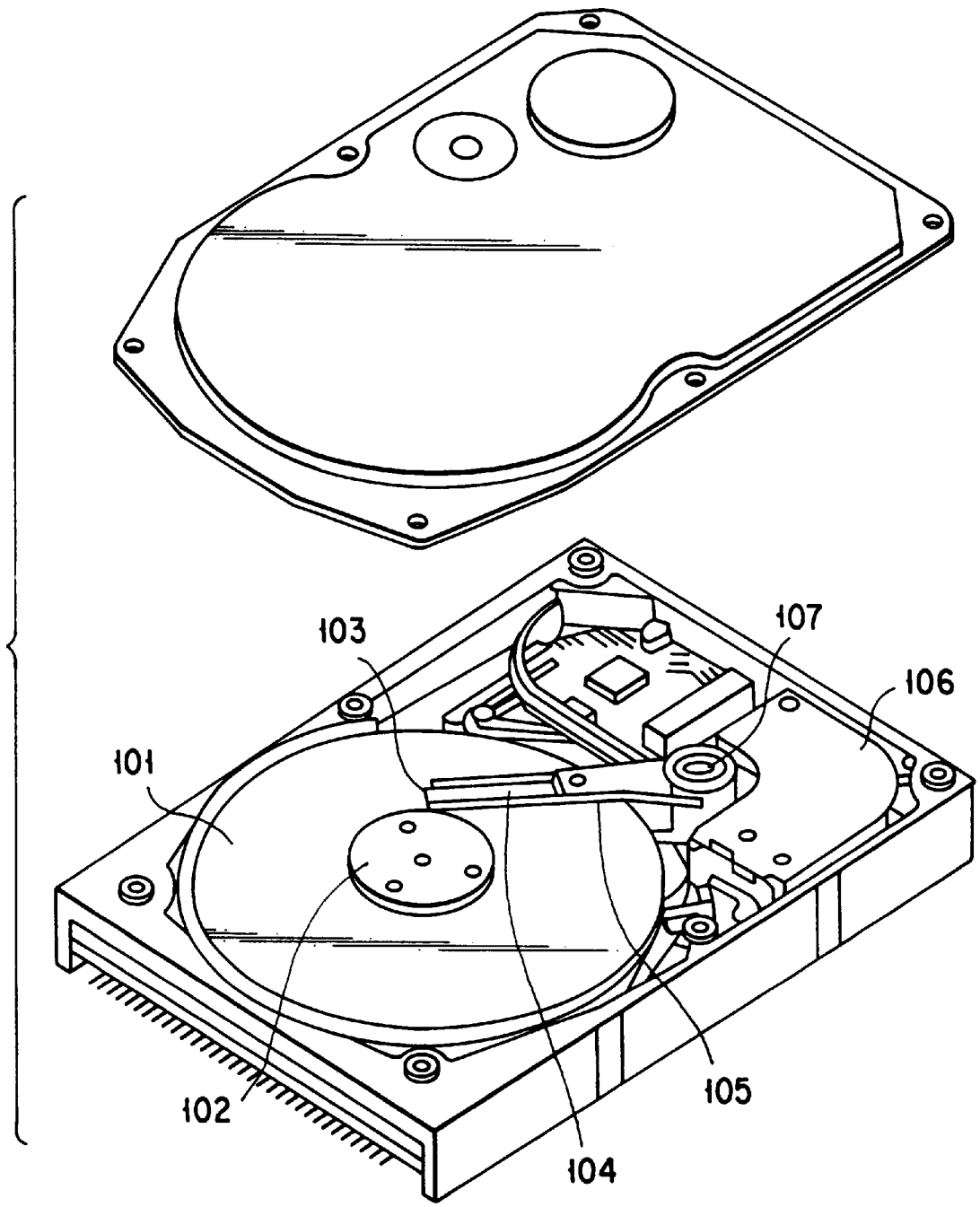
F I G. 1

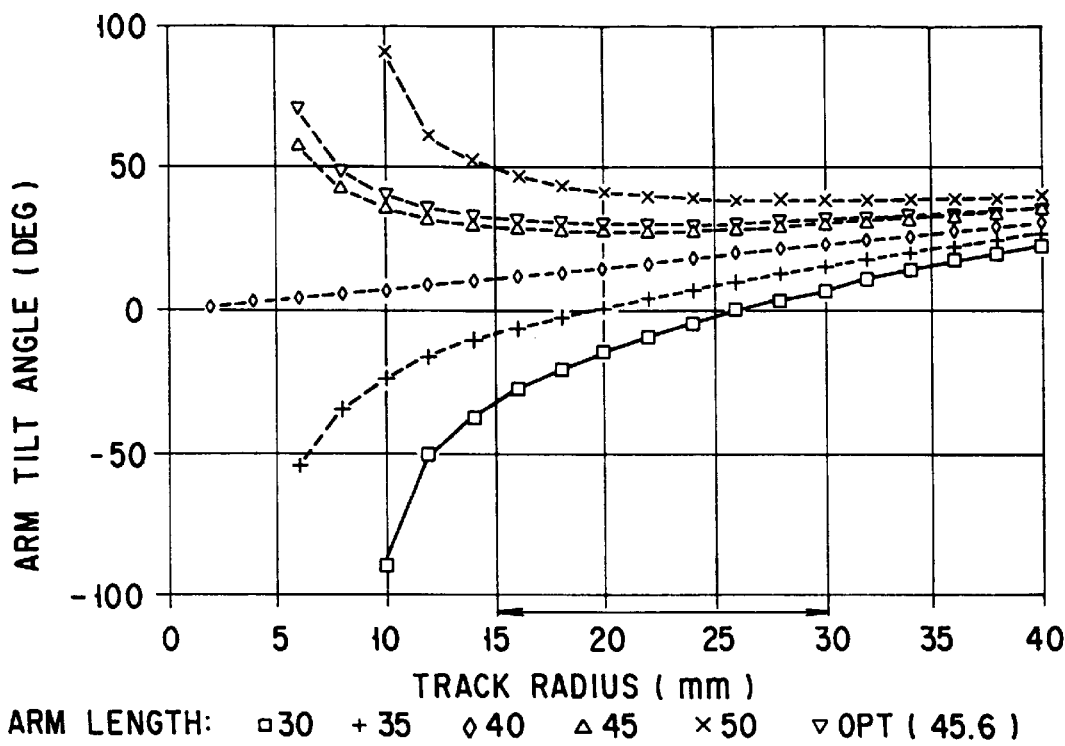
F I G. 4
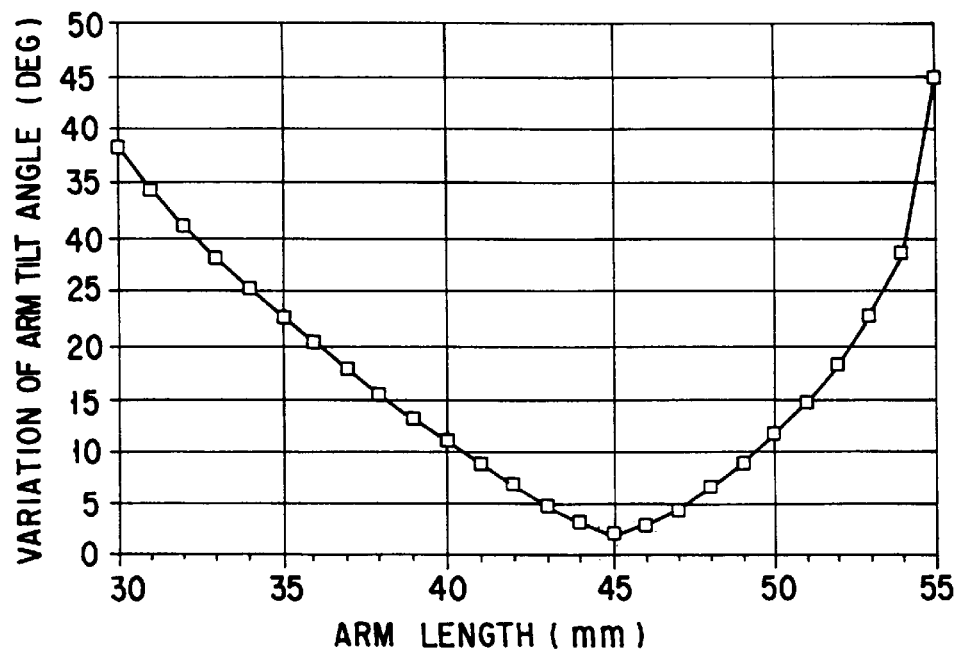
F I G. 5

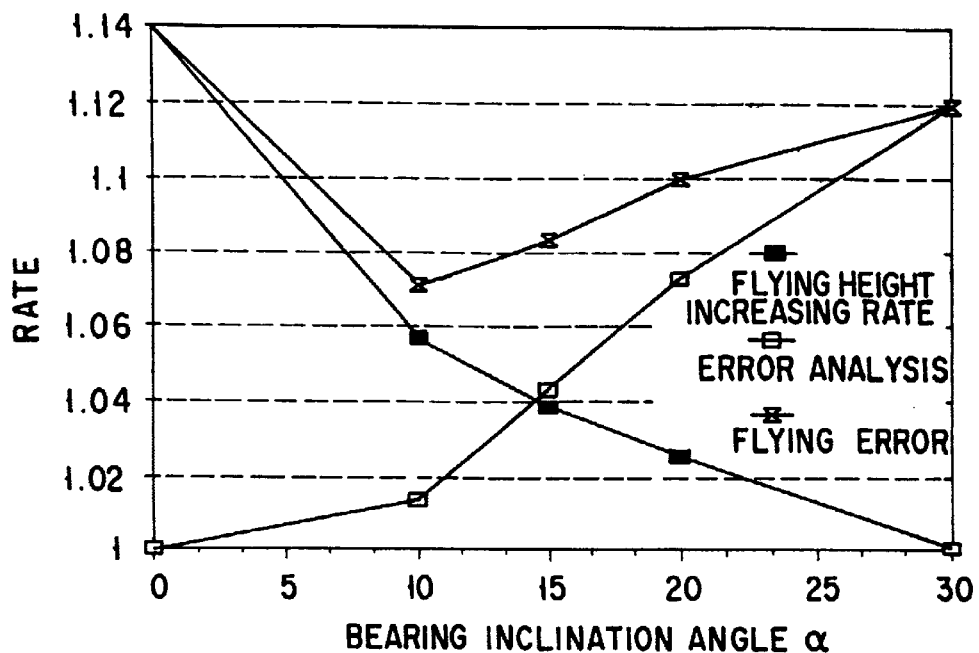
F I G. 9
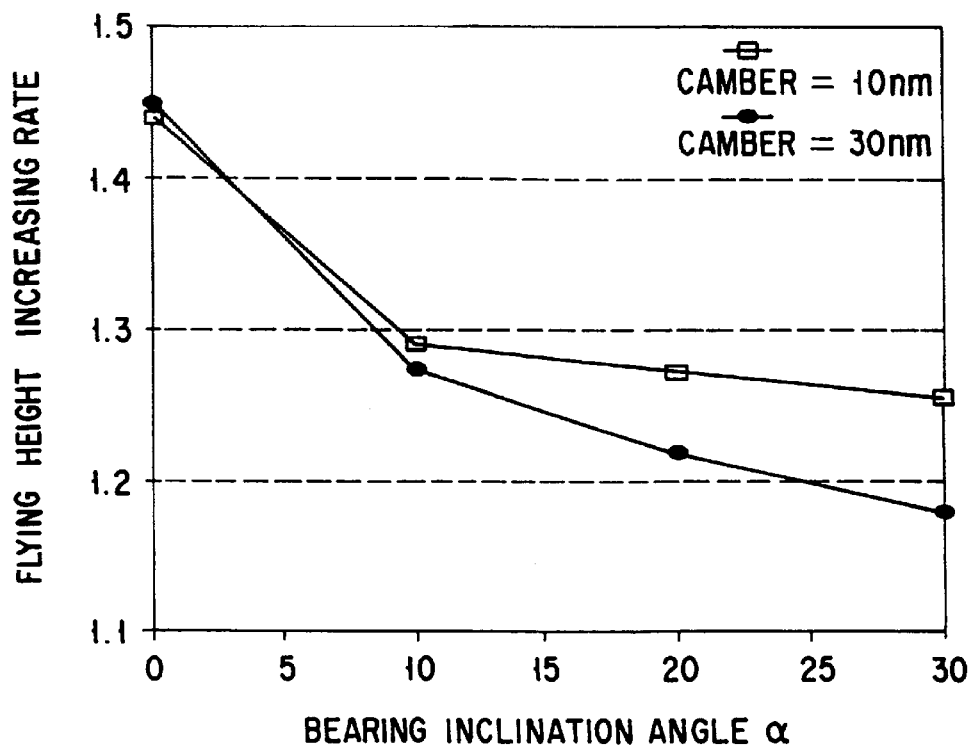
F I G. 10

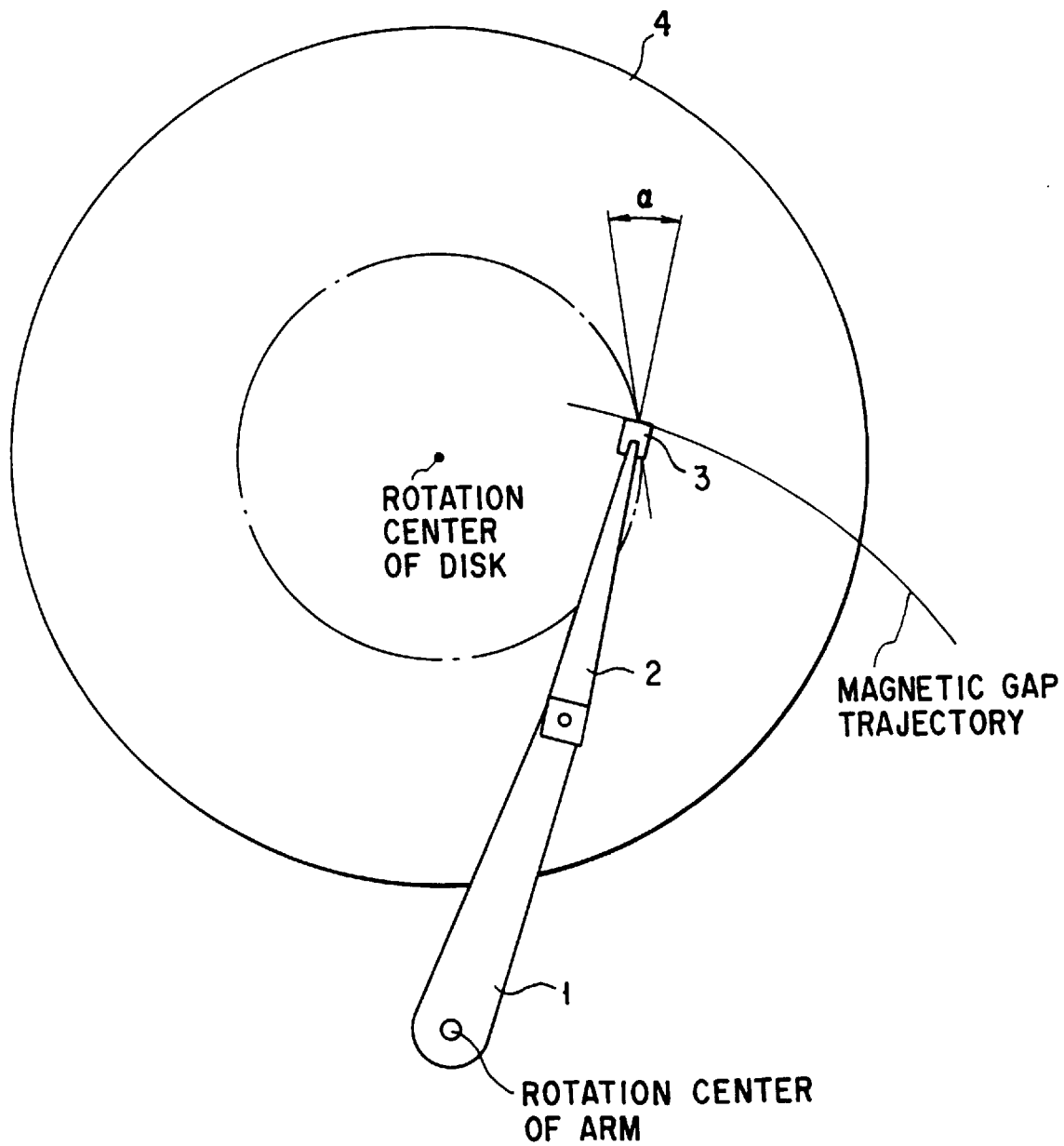
F I G. 13

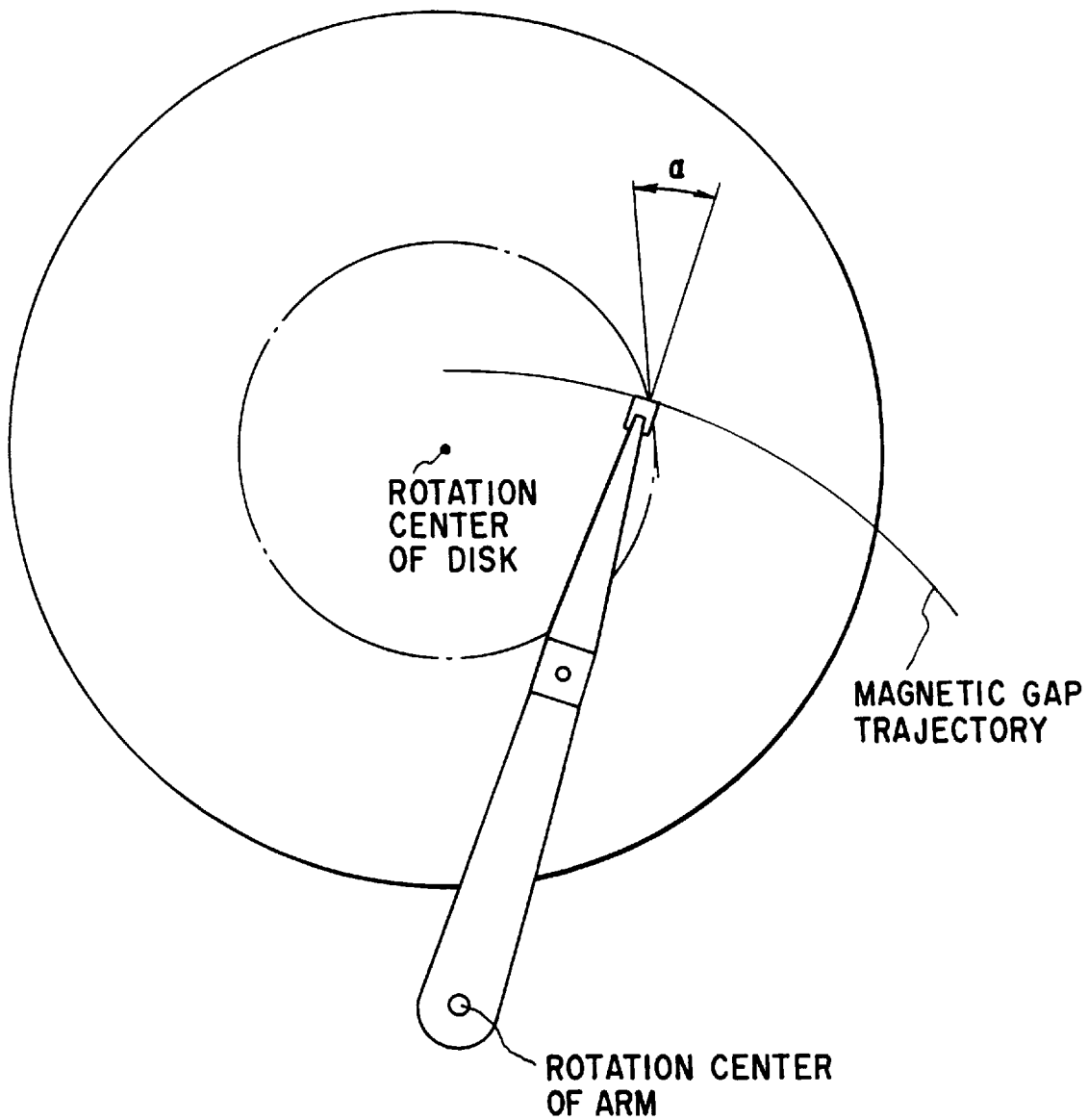
F I G. 14

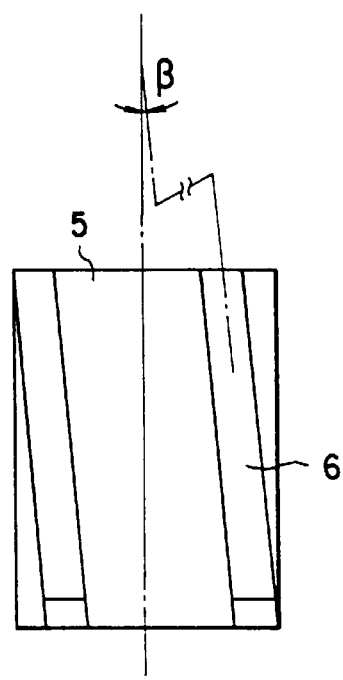
F I G. 15A
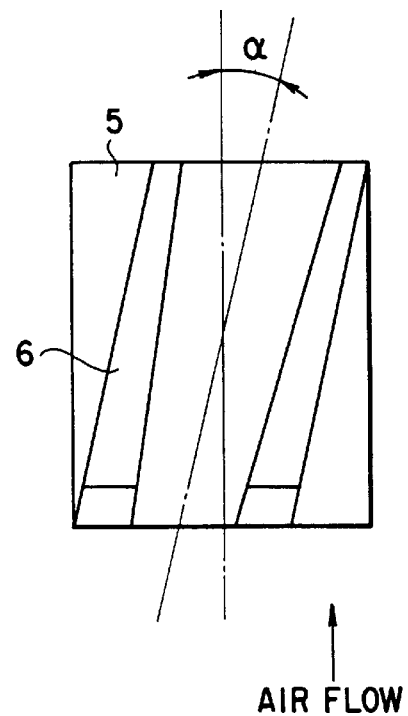
AIR FLOW
F I G. 16A
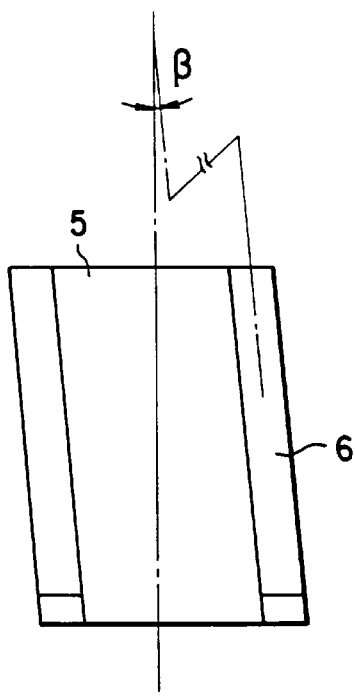
F I G. 15B
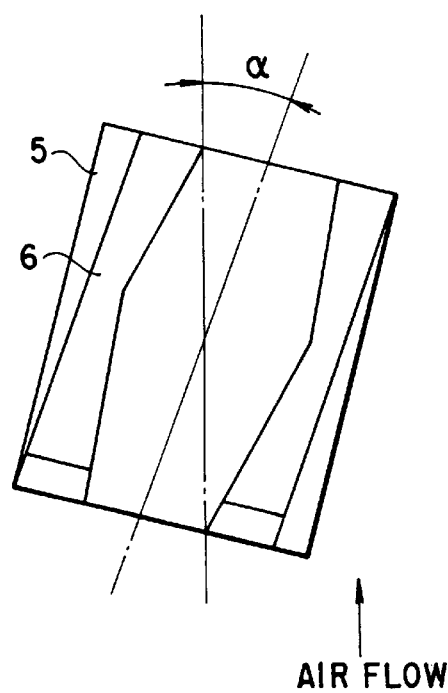
AIR FLOW
F I G. 16B

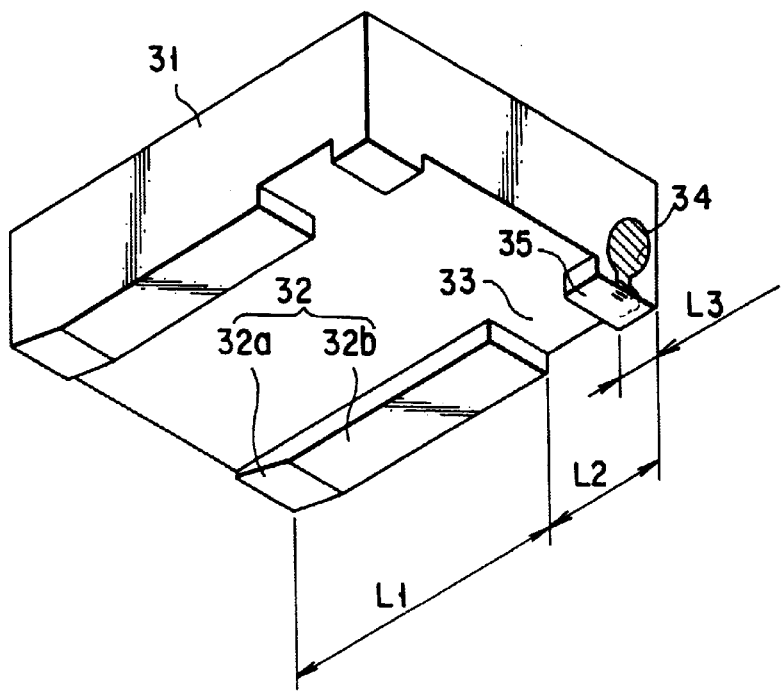
F I G. 17
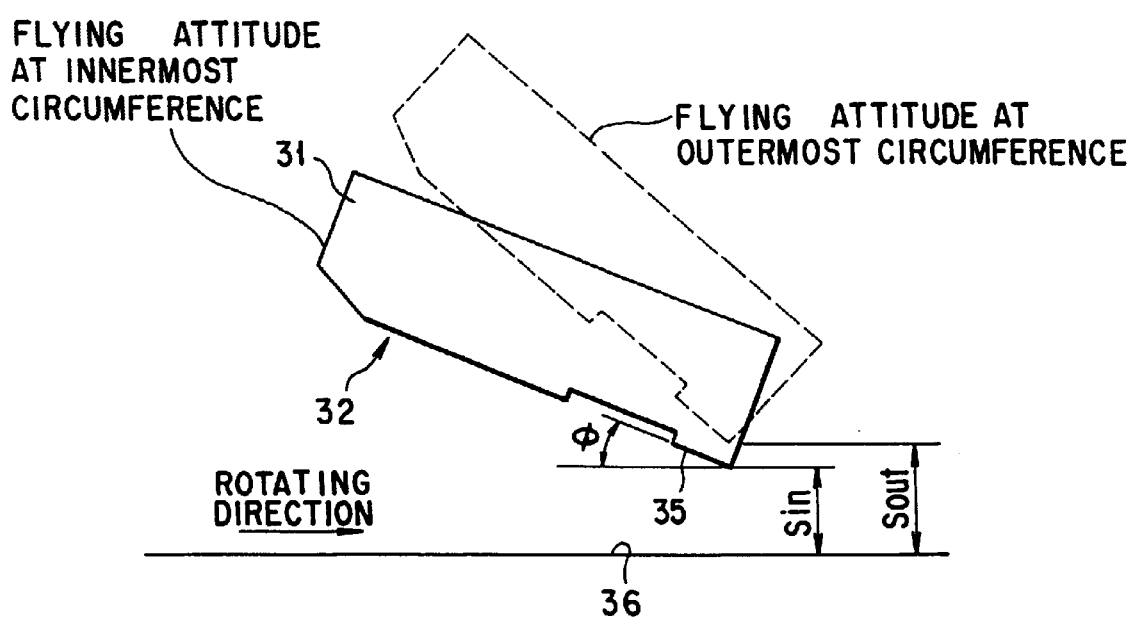
F I G. 18

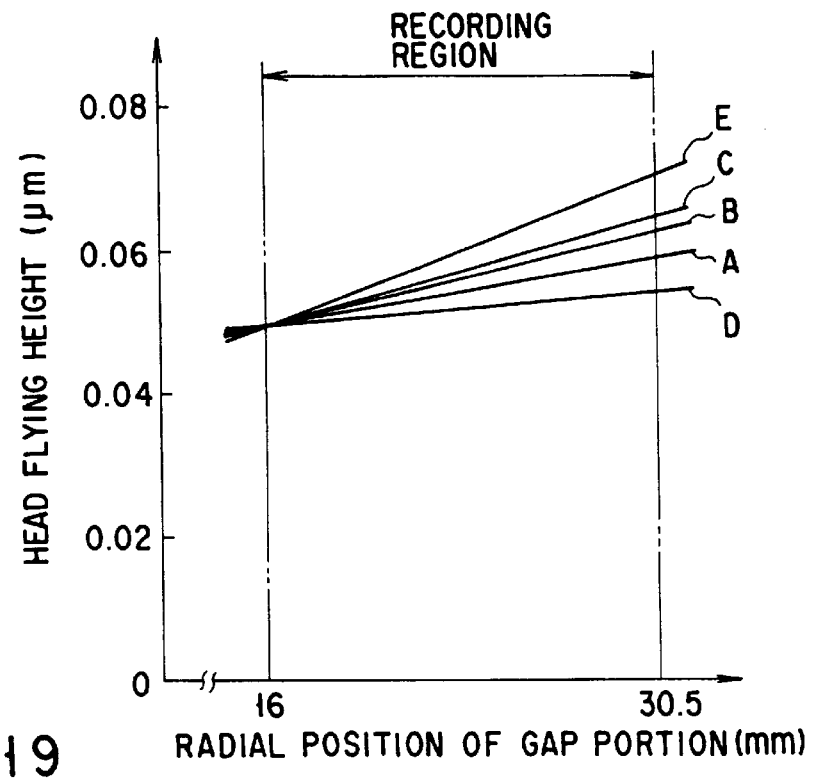
F I G. 19
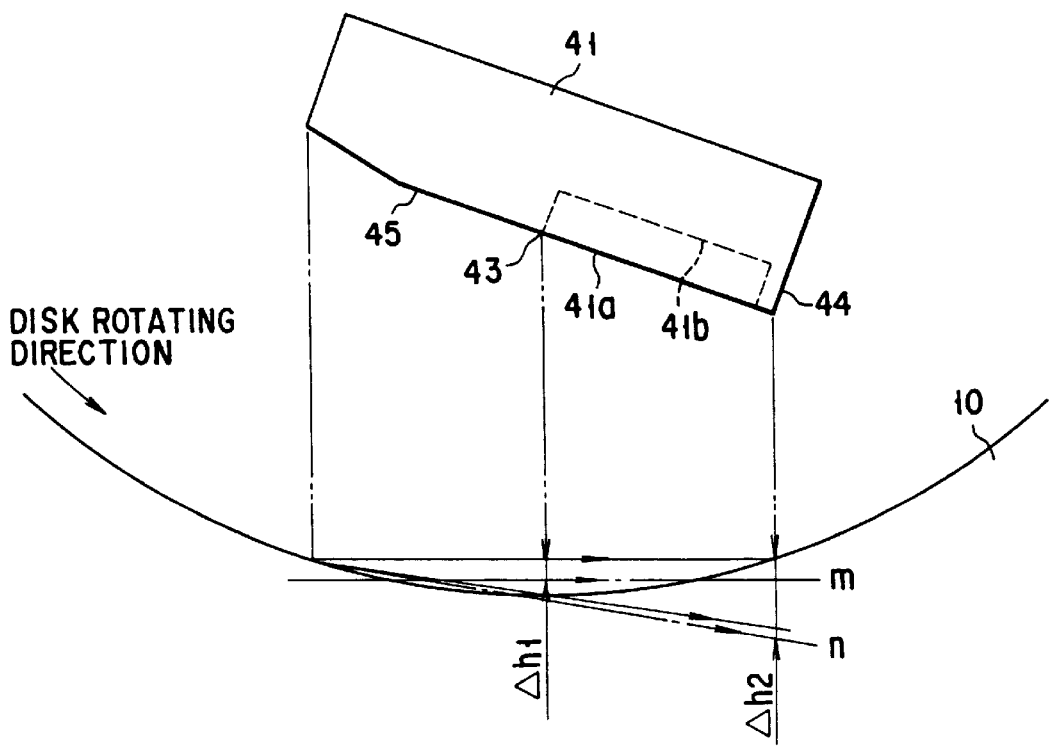
F I G. 20

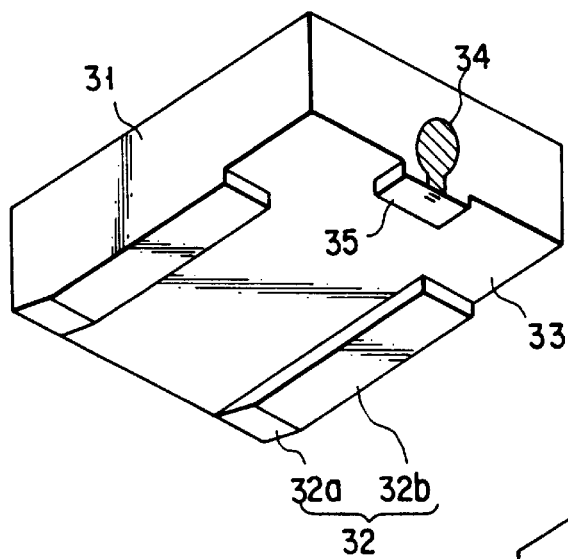
F I G. 21
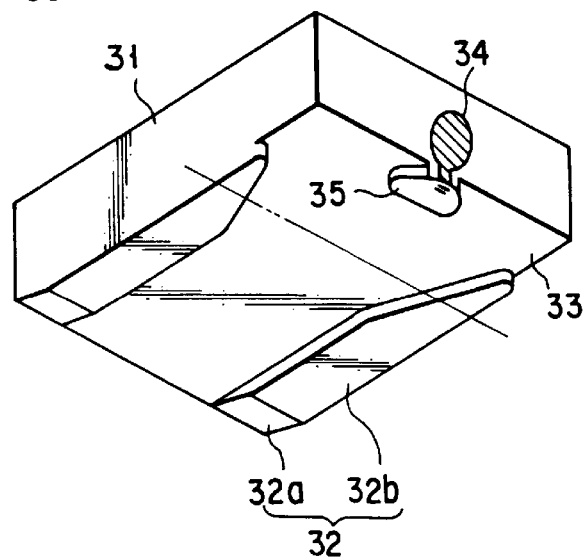
F I G. 22
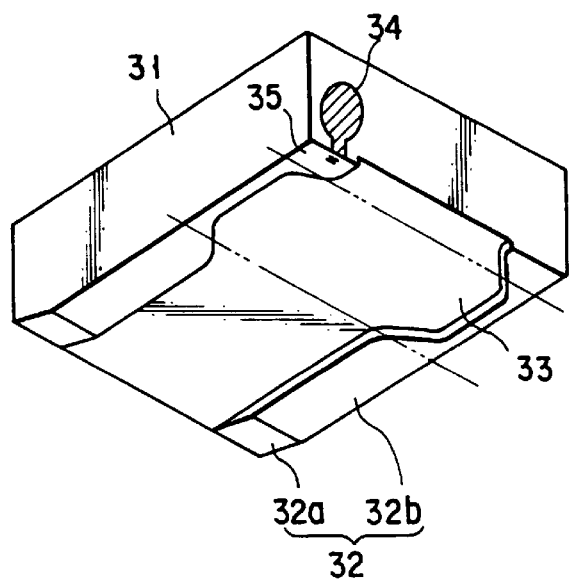
F I G. 23

$\theta 1, \theta 2 > 0$

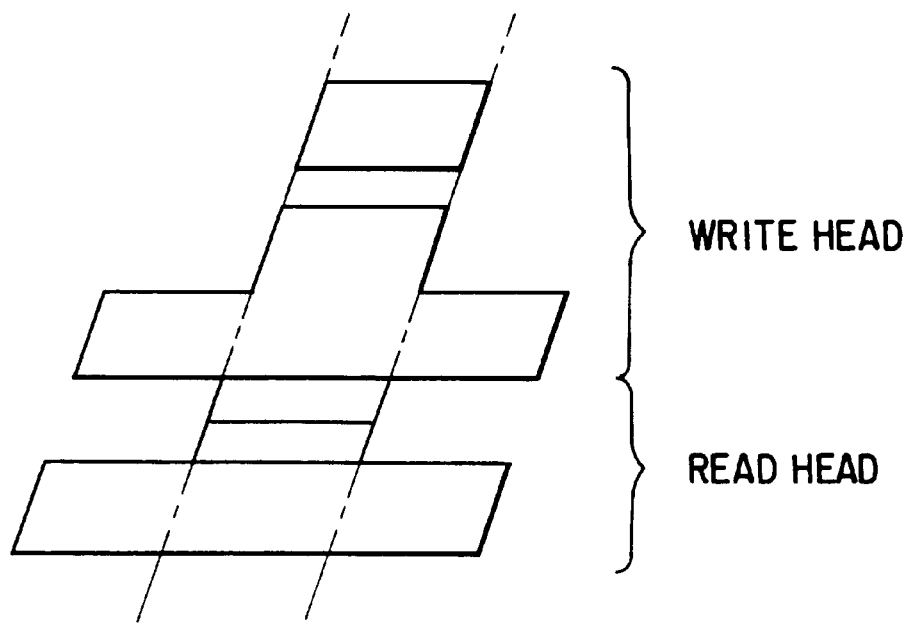
F I G. 24G
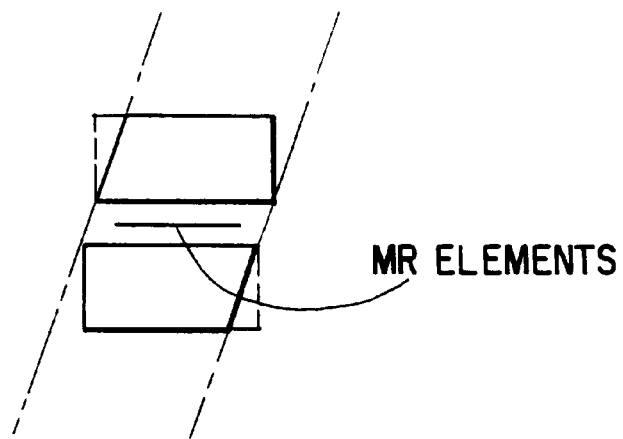
F I G. 24H

MAGNETIC DISK DRIVE HAVING A CONSTANT SKEW ANGLE

CROSS-REFERENCE TO THE RELATED APPLICATION

This application is a continuation-in-part of U.S. patent application Ser. No. 08/019,875 filed on Feb. 19, 1993, now abandoned.

BACKGROUND OF THE INVENTION

1. Field of the Invention

The present invention relates to a magnetic disk drive having a magnetic head capable of high-density writing/reading.

2. Description of the Related Art

Recently, the development of a magnetic disk drive, for increasing a recording density, is popular. In order to achieve an increase in the recording density of a magnetic disk drive, there are two possible approaches such as an increase in bit density (recording density in the disk circumferential direction) and an increase in track density (recording density in the disk radial direction). In order to achieve the techniques of these approaches, particularly, a magnetic head which remarkably improves a reproduction capability is being developed. In the development of such a magnetic head, a method is used to directly detect a medium surface magnetic field which does not depend on a relative speed, rather than the conventional method of detecting a medium surface magnetic field by electromagnetic induction which depends upon a relative speed.

A typical example of the magnetic field direct detecting method is to detect the change in resistance of a magnetoresistive (MR) element due to the strength of the medium surface magnetic field. A magnetic head employing this method is usually called an MR head. The magnetic head having separate writing and reading elements, entails the following drawbacks since there is a certain distance between both elements, i.e., magnetic gaps of both elements (meaning a center position of the effective portion of the reading element, hereinafter, referred to as merely a magnetic gap for convenience).

Many of the magnetic disk drives employ a rotary actuator for moving the magnetic head in the radial direction of the magnetic disk by rotating the arm on which the magnetic head is mounted. The rotary actuator has a simpler structure than the linear actuator, and has merits such as being vibration-proof and having low power consumption. In the case of the rotary actuator, the skew angle (created between the magnetic gap length direction of the writing/reading element and the rotating direction of a magnetic disk) is set such that it changes from the case of the inner circumference of a disk to the case of the outer circumference thereof. In the case of a magnetic head having separate writing and reading elements, an error is created in the writing track and reading track between the inner and outer circumferences of a magnetic disk with the conventional reading element arrangement. This track misregistration can be presented by D·sin θ, when a skew angle is presented by θ.

As a solution to the above-described drawback, the following countermeasure is proposed.

A design of such as an actuator is considered, thereby reducing the change in skew angle of the magnetic head between the innermost circumference of the magnetic disk and the outmost circumference thereof.

However, this countermeasure, when conducted along with the constant density recording method (CDR method), which can increase the recording capacity per disk about 30% as compared to the conventional method by uniforming the recording density in the inner and outer circumferences of the magnetic disk, entails the following drawback.

That is, in the case where there is no substantial difference in skew angle between the inner and outer circumferences of a magnetic disk, there is only one parameter which varies between the inner and outer circumferences, which is the radius (when the disk rotation number is constant, it is the relative speed).

In this case, it is difficult to reduce the variation of the head flying height between the inner and outer circumferences by appropriately combining the change in relative speed and the change in skew angle as in the conventional technique. Consequently, in the CDR method in which the inner and outer circumferences are divided into several zones, and the tracks of the inner to outer circumferences are set to have the same recording density as that of the tracks in the inner circumference, it is no longer possible to achieve the characteristic required for the CDR method, to uniform the head flying height (head spacing) of the inner and outer circumferences of the recording region. The minimum head flying height (set value) with which a high reliability can be obtained is determined mainly by the glide height (maximum projection height) of a magnetic disk. The glide height does not vary between the inner and outer circumferences of a magnetic disk. Therefore, when the minimum head flying height is set substantially constant between the inner and outer circumferences of the magnetic disk, substantially the same linear recording density can be achieved for both the inner and outer circumferences, making it possible to maximize the recording capacity obtained in one side of a magnetic disk while maintaining a high reliability. Thus, it is important to solve the above-described drawbacks.

As another countermeasure for track misregistration, there is a method in which the effective track width of the writing element is made wider than the effective track width of the reading element.

However, in the case where the track pitch is narrowed so as to achieve a high recording density, the track width of the reading element is remarkably narrowed, deteriorating the signal quality in terms of writing/reading characteristics. Therefore, it is not preferable to employ the above method as means for improving the real recording density.

SUMMARY OF THE INVENTION

An object of the present invention is to provide a magnetic disk drive which can achieve a constant characteristic of the head flying height between the inner and outer circumferences of the magnetic disk, which is required when the CDR method is employed, in a magnetic head which has separate writing and reading elements such as an MR head, and the recording capacity can be increased by about 30% as compared to the conventional technique in such an arrangement that the variation of the skew angle between the inner and outer circumferences of the magnetic disk is suppressed.

Another purpose of the present invention is to provide a magnetic disk drive which can achieve a good recording characteristic by reducing the edge effect.

The first aspect of the present invention can be achieved by: a magnetic disk drive for carrying out writing/reading an information to a magnetic disk having a plurality of tracks including an innermost circumference track and an outermost circumference track, comprising: a rotary actuator; a magnetic head slider mounted magnetic head which is separately constructed with a writing element and a reading element comprising a magnetic gap having functions of writing/reading the information to the magnetic disk; and a rotary actuator arm having a first end connected to the rotary actuator and a second end connected to the magnetic head slider; wherein the magnetic head slider includes an inflow end and an outflow end for a fluid flow occurred by a rotation of the magnetic disk and at least one bearing occurring dynamic pressure by the fluid flow, the magnetic head is provided close to the outflow end, a skew angle created between a magnetic gap length direction of the magnetic gap and a rotating direction of the magnetic disk is substantially constant between the innermost circumference track and the outermost circumference track, and the bearing is arranged at a given angle with respect to the rotating direction of the magnetic disk such that the outflow end is located at an outer circumferential side of the magnetic disk from the inflow end, with regard to the rotating direction of the magnetic disk. The first aspect can be also achieved by a magnetic disk drive according to the above, wherein an angle made between the tracking direction and the bearing is determined in accordance with an air flow created by the rotation of the magnetic disk. The first aspect can be also achieved by a magnetic disk drive according to the above, wherein an angle made between the tracking direction and the bearing is 30° or less.

With the magnetic disk drive according to the first aspect of the present invention, the head flying height can be set substantially at constant even in the case where the variation of the skew angle between the inner and outer circumferences of a magnetic disk is small. Consequently, in a magnetic head having separate writing/reading element, the recording capacity per one side of a magnetic disk can be increased by effectively utilizing the CDR method.

With regard to the dynamic pressure bearing surface of the magnetic head slider, in the case where the magnetic head is allowed to seek on the magnetic disk by setting a predetermined bearing inclination angle, the amount of fluid leaking from a side of the magnetic slider increases as the relative speed increases as from the inner circumference to the outer circumference. Thus, the inflow edge side of the bearing is placed further away from the magnetic disk as compared to the outflow edge side. In other words, the pitching angle, which is an angle made between the direction of the line connecting the inflow end of the magnetic head slider to the outflow end and the magnetic disk surface direction, is varied to increase, and therefore the flying attitude of the magnetic head slider varies such as to converge to the vicinity of the outflow end of the bearing surface in which the magnetic gap of the writing/reading elements is provided.

As the magnetic head moves from the inner circumference of a magnetic disk to the outer circumference, the relative speed increases, thus increasing the amount of the leaking fluid. Consequently, the pressure center of flying force caused by the magnetic head slider moves towards the inner circumference, and therefore the flying height increasing rate on the slider outer circumference side (the ratio of the head outflow end flying height at the outermost circumference with respect to that of the innermost circumference) becomes small as compared to that of the slider inner circumference side.

Further, the magnetic gap is provided at the outflow end of the outer circumference side of the magnetic head slider, and the bearing inclination angle is set in the direction of which an outflow edge of the bearing surface of the magnetic head slider is set to outer circumferential side of the magnetic disk than an inflow edge for a rotating direction of the magnetic disk, thus creating a difference in angle between the skew angle and the bearing inclination angle. With this structure, the bearing inclination angle varies between the inner and outer circumferences even though the skew angle is constant, thus reducing the head flying height of the outflow end on the slider outer circumferential side at the outer circumference. Such an effect becomes more prominent as the diameter of the magnetic disk becomes smaller.

With the synergistic effect of the above operations, the variation of the head flying height at the magnetic gap position of the magnetic head slider can be reduced by setting a predetermined bearing inclination angle, even in the case where the relative speed increases towards the outer circumference, by setting a substantially constant skew angle while the magnetic head is moved from the inner circumference to the outer circumference.

As described above, according to the first aspect of the present invention, in the magnetic disk drive having a magnetic head in which writing/reading elements are separately provided, such as in an MR head, the head flying height can be made substantially at constant between the inner and outer circumferences of a magnetic disk even if the skew angle is set substantially at constant between the inner and outer circumferences of the magnetic disk in which recording density can be improved. Therefore, there can be provided the above magnetic disk drive which can employ the CDR method which can increase the recording capacity by 30% as compared to the conventional technique.

The second aspect of the present invention can be achieved by a magnetic disk drive for carrying out writing/reading an information to a magnetic disk having a plurality of tracks including an innermost circumference track and an outermost circumference track, comprising: a rotary actuator; a magnetic head slider mounted magnetic head which is separately constructed with a writing element and a reading element comprising a magnetic gap having functions of writing/reading the information to the magnetic disk; and a rotary actuator arm having a first end connected to the rotary actuator and a second end connected to the magnetic head slider; wherein the head slider includes: a air bearing surface in which a dynamic pressure is generated by fluid flow generated by the rotation of the magnetic disk, a non-air bearing surface, provided on a rear side of the air bearing surface, with respect to a rotating direction of the magnetic disk, in which a dynamic pressure is little generated by the rotation of the magnetic disk, and a pad portion, provided on a rear side of the non-air bearing surface, with respect to a rotating direction of the magnetic disk, in which the writing element and the reading element are mounted. The second aspect of the invention can be also achieved by a magnetic disk drive according to the above, wherein the pad portion includes a magnetic gap portion between the writing element and the reading element, and a length from a starting portion of the non-air bearing surface to the magnetic gap is ½ or less of a length of the dynamic pressure bearing. The second aspect of the present invention can be also achieved by a magnetic disk drive according to the above, wherein an area of the pad portion is ⅕ or less of an area of the air bearing surface.

According to the second aspect of the present invention, the variation amount of the head flying height between the inner and outer circumferences of the recording region can be made small even in the case where the variation of the skew angle between the inner and outer circumferences of a magnetic disk is small. Therefore, in a magnetic head slider in which writing/reading elements are separately provided, the CDR method can be effectively utilized, and the recording capacity per one side of a magnetic disk can be increased.

According to the second aspect, a non-air bearing surface in which no substantial dynamic pressure is generated by the rotation of the magnetic disk in the rear side of the magnetic head slider with respect to the rotating direction of the magnetic disk, and the pad portion provided at the back of the non-air bearing surface, has a function in which the writing element and reading element are separately provided. With this structure, even if there is no substantial change in skew angle, and only the relative speed increases from the inner circumference of the magnetic disk to the outer circumference, such a characteristics that the head spacing (gap between the writing element and reading element, and the magnetic disk surface), which greatly influences the magnetic writing/reading characteristics, does not change very much, can be obtained with a combination of an action in which the entire magnetic head slider moves away from the magnetic disk and an action in which the front side of the magnetic head slider floats, since the dynamic pressure generated in the front side air bearing surface is larger than the dynamic pressure generated in the pad portion on the rear side of the magnetic head slider.

In particular, when the length from the opening portion of the non-dynamic bearing portion to the gap portion of the writing and reading elements provided in the pad portion is set ½ or less of the length of the air bearing surface, and the area of the pad portion in which the writing element and reading element are mounted, is set ⅕ or less of the area of the air bearing surface, the variation of the spacing between the inner and outer circumferences of the recording region can be made small, and therefore a high density writing/reading can be achieved while maintaining its reliability.

According to the second aspect of the present invention, in the magnetic head slider in which an element having a recording function with respect to a magnetic disk serving as a data recording medium, and an element having a reading element are separately provided, the head spacing constant characteristics between the inner and outer circumferences of the recording region of a magnetic disk, which is applicable to the CDR method, can be achieved, even in the driving structure in which the skew angle does not substantially change between the inner and outer circumferences of the magnetic disk, by providing a non-dynamic bearing portion in which a dynamic pressure is not substantially generated in the rear side with respect to the rotating direction of the disk, by the rotation of the disk, and providing the writing element and reading element in the pad portion of the rear side where no substantially dynamic pressure is generated, and thus a highly reliable magnetic disk drive can be provided.

The third aspect of the present invention can be achieved by a magnetic disk drive for carrying out writing/reading of an information to a magnetic disk having a plurality of tracks including an innermost circumference track and an outermost circumference track, comprising: a rotary actuator; a magnetic head slider mounted magnetic head which is separately constructed with a writing element and a reading element including a magnetic gap having functions of writing/reading of the information to the magnetic disk; and a rotary actuator arm having a first end connected to the rotary actuator and a second end connected to the magnetic head slider; wherein the writing/reading elements has a trailing edge for setting an effective recording width, and a portion opposing to the magnetic disk of the writing element, is situated within a region scanned by the trailing edge.

In the magnetic disk drive according to the third aspect of the present invention, all the portion of, at least, the recording magnetic pole is situated in a region scanned by the trailing edge, and therefore the edge effect is decreased, thus achieving a good recording characteristic.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 a schematic view showing a magnetic disk drive in which a rotary actuator is used;

FIG. 4 is a diagram showing the relationship between the position of the magnetic head with respect onto the magnetic disk with a parameter of an arm length R, that is, radius r, and the arm inclining angle;

FIG. 5 is a diagram showing the relationship between the arm length and the arm inclining angle fluctuation amount (difference between maximum value and minimum value);

FIG. 9 is an optimum value of the bearing inclining angle obtained from the flying height increasing rate and the error analysis;

FIG. 10 is a diagram showing the result of an analysis of the flying height increasing rate of the magnetic head in the case where the camber is increased;

FIG. 13 is a schematic view showing a magnetic disk drive according to the second embodiment of the present invention;

FIG. 14 is a schematic view showing a magnetic disk drive according to the third embodiment of the present invention;

FIGS. 15A and 15B are diagrams each showing a structure of a magnetic head slider applied to the magnetic disk drive according to the present invention;

FIGS. 16A and 16B are explanatory diagrams of the bearing inclination angle of a head having an arbitrary shape;

FIG. 17 is a perspective view showing another embodiment of a magnetic head slider applied to the magnetic disk drive according to the present invention;

FIG. 18 is an explanatory diagram showing a change in head spacing between the inner and outer circumferences of the recording region of the magnetic head slider according to the present invention;

FIG. 19 is an explanatory diagram showing the result of the analysis of the head spacing change between the inner and outer circumferences of the recording region of the magnetic head slider according to the present invention;

FIG. 20 is an explanatory diagram showing the characteristics of the magnetic head slider according to the present invention;

FIG. 21 is a perspective view showing a first modification of a magnetic head slider according to the present invention;

FIG. 22 is a perspective view showing a second modification of a magnetic head slider according to the present invention;

FIG. 23 is a perspective view showing a third modification of a magnetic head slider according to the present invention; and FIGS. 24A to 24H are views of magnetic pole opposite to recording media according to the invention.

DETAILED DESCRIPTION OF THE PREFERRED EMBODIMENTS

Figure 2A:
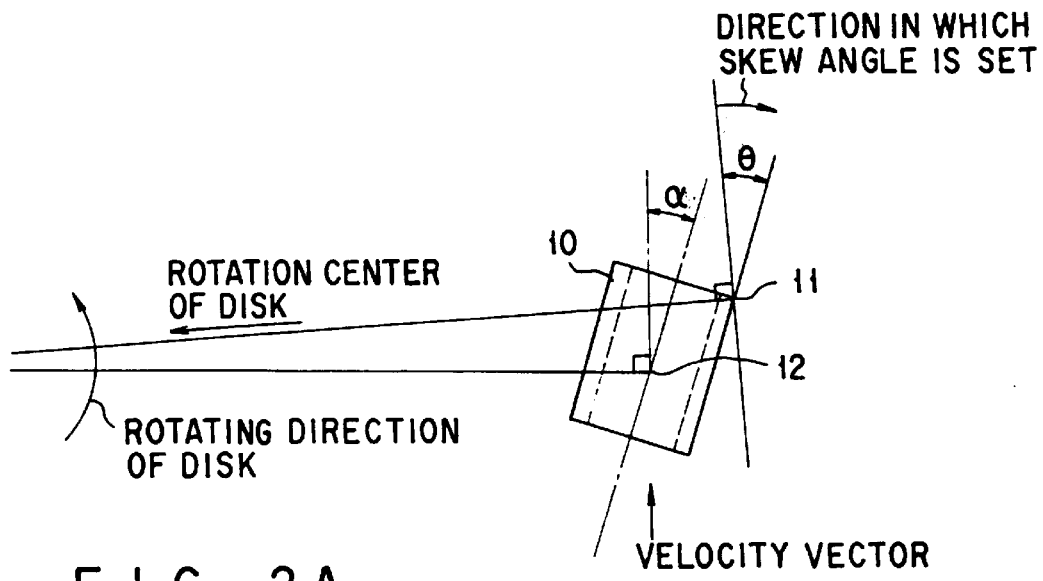
FIGS. 2A and 2B are schematic views showing a magnetic head assembly used in a magnetic disk drive according to the present invention.

Embodiments of the present invention will now be described with reference to accompanying drawings.

Before the description of actual embodiments, the structure of a magnetic disk drive in which a rotary actuator is used, will be briefly described. FIG. 1 is a perspective view showing a magnetic disk drive in which a rotary actuator is used.

A magnetic disk 101 serving as a data recording medium is set on a spindle 102, and rotated at a constant rotation number by the spindle 102.

A magnetic head slider 103 carrying a magnetic head is mounted on a tip end of a thin-plate-like suspension 104, and accesses to the magnetic disk 101 in order to write and read data. The most of the following embodiments are directed to a composite magnetic head 103 (which is, for example, employed MR head as a reading element) in which writing and reading elements are separately provided.

The suspension 104 is connected to an end of an arm 105 which has a bobbin portion holding a driving coil (not shown).

The other end of the arm 105 has a voice coil motor 106, which is one type of the linear motor. The arm 105 is held by ball bearings, not shown, provided in two locations, i.e. above and below a fixing axis 107, and the arm 105 can be freely rotated and/or oscillated by the voice coil motor 106.

The voice coil motor 106 consists of a driving coil, not shown, wound around the bobbin portion of the arm 105, and a magnetic circuit formed of permanent magnets arranged to sandwich the coil and to oppose to each other, and an opposing yoke.

Figure 2B:
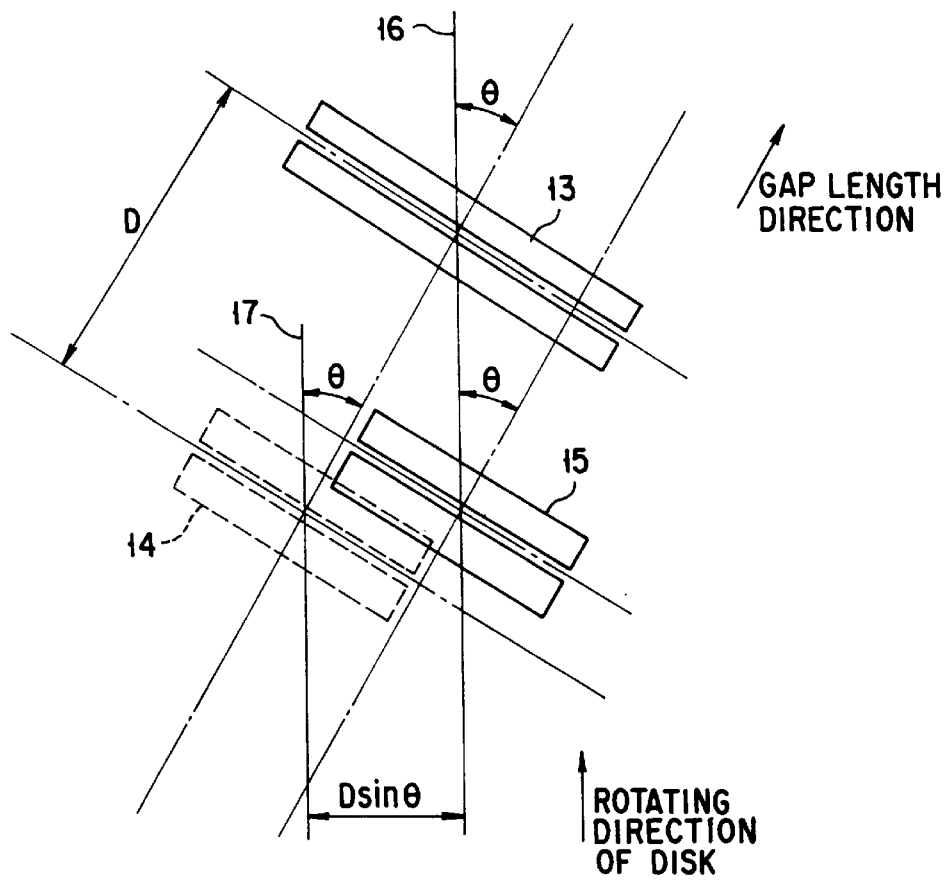

A brief structure of a magnetic head assembly used in the magnetic disk drive according to the present invention will be described with reference to FIGS. 2A and 2B. FIG. 2A is a diagram showing an arrangement of the magnetic head slider with respect to a magnetic disk, and FIG. 2B is an arrangement of the magnetic gap between the writing and reading elements provided on the magnetic head slider.

The followings are definitions of the terms used in the detailed description of the preferred embodiments of this specification.

A skew angle (expressed by θ) is an angle defined between the magnetic gap length direction of the writing and reading elements and the rotating direction of the magnetic disk when the head is set at the magnetic gap position. An arm inclination angle (expressed by ψ) is an angle made between a line connecting the rotation center of an arm constructing rotary actuator by O' with the magnetic gap P, and the rotating direction of the magnetic disk. A bearing inclination angle (expressed by α) is an angle made between the rotating direction of the magnetic disk and the longitudinal direction of the bearing surface of the magnetic head slider. The rotating direction of the magnetic disk is an axis perpendicular to the radial direction of the magnetic disk.

Although the skew angle θ corresponds to a installation direction of the slider, and is different amount in each device, the arm inclination angle ψ is defined as an amount which does not corresponds to the installation direction of the slider. More specifically, in a certain device, when the relationship between both angles are considered, the skew angle θ is obtained by adding a constant angle to the arm inclination angle ψ. Accordingly, the change of the skew angle θ is equal to the change of the arm inclination angle ψ.

The magnetic gap between the writing and reading elements is provided closer to the outflow end of the bearing surface of the outer circumference side of the magnetic head slider 10. In the case where the magnetic head slider 10 is made to fly by setting a substantially constant skew angle θ, the relative arrangement of a writing element 13 and a reading element 15 with respect to the track width direction is displaced to the outer or inner periphery side to form a multilayer structure, which is an arrangement shown in FIG. 2B, for the purpose of avoiding the track misregistration between the writing and reading elements. A track misregistration Z between the writing and reading elements, a distance D of the magnetic gap between both elements, and a skew angle θ have a relationship represented by a formula, Z=D·sin θ. The process for making such an arrangement can be easily achieved by the technique cultivated in manufacturing semiconductors.

In the rotary actuator having the above-described magnetic head assembly, the variation of the skew angle as from the inner circumference to the outer circumference in the recording region of the disk can be suppressed to about several degrees or less by appropriately adjusting the distance between the rotation center of the magnetic disk and the rotation center of the arm, and the distance between the rotation center of the arm and the magnetic gap between the writing and reading elements (that is, arm length), thus making it possible to allow the magnetic head to seek on a magnetic head, by setting a substantially constant skew angle. Such a method will be described.

As mentioned, the track misregistration Z between the writing track and the reading track is substantially the same as Z=D·sin θ, and therefore in order to suppress the track misregistration between the writing track and reading track in the case where a composite type magnetic head is accessed within a range from the innermost circumference to the outer most circumference, it is required that the variation of the angle made between the line connecting the rotation center of the actuator and the composite magnetic head, and the rotating direction (to be called "arm inclination angle" hereinafter) at the magnetic head position be small.

Figure 3:
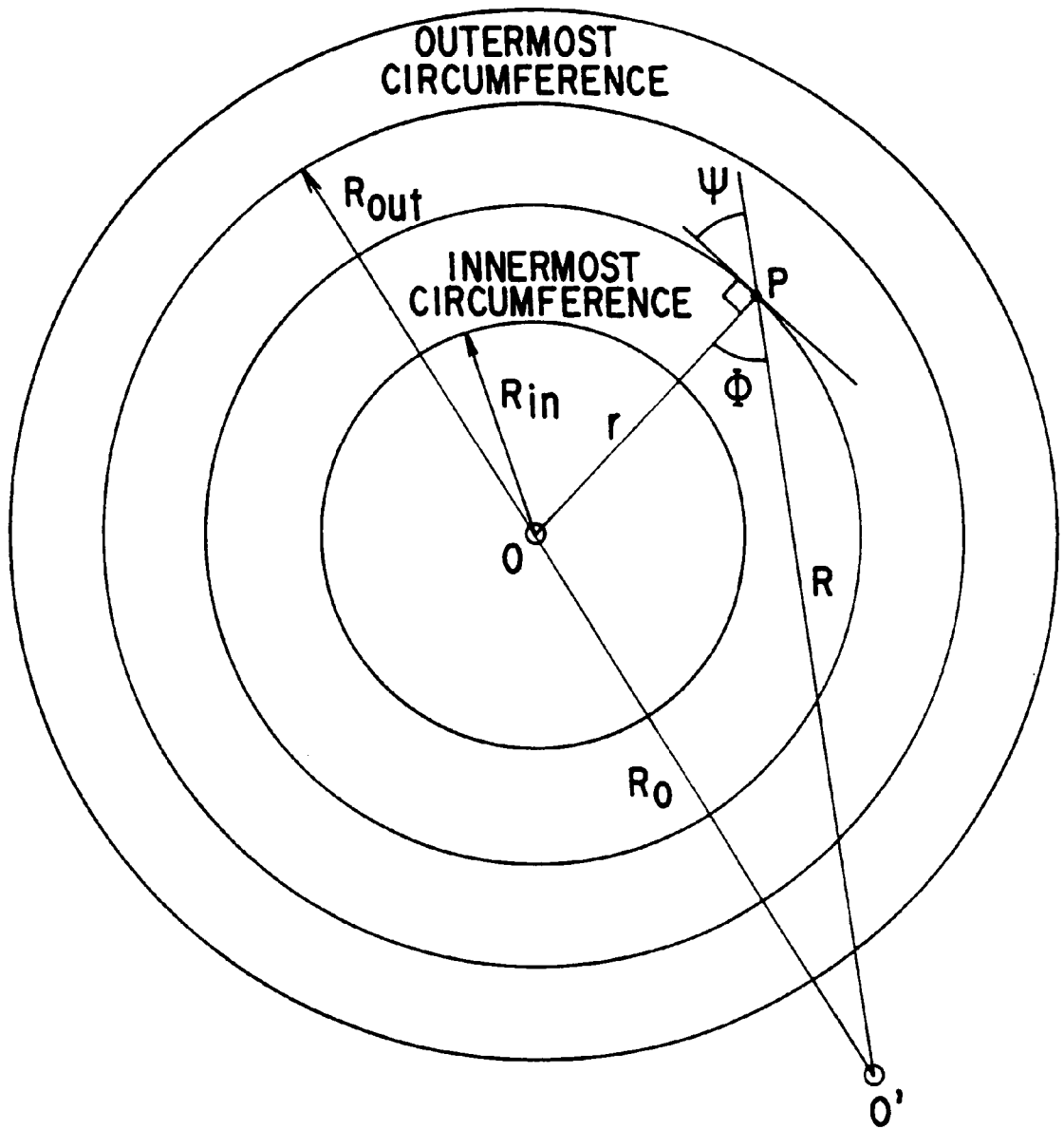
FIG. 3 is a schematic view showing a magnetic disk drive in which a rotary actuator is used.

FIG. 3 is a perspective view of a magnetic disk drive employing a rotary actuator mode.

Point O: Center point of magnetic disk
Point O': Rotation center (pivot center) of rotary actuator
Point P: Center of recording head
r: Length of line O-P (equivalent to radius of location of magnetic head on magnetic disk)
R: Length of line O'-P (length from rotation center of rotary actuator to magnetic head (to be called "arm length"))
$R_0$: Length of line O-O'
$\Phi$: Angle made between line O-P and line O'-P
$\psi$: Arm inclination angle With the above-defined symbols, the following relationship can be obtained.

$$\Phi=\cos^{-1}(-(R_0^2-R^2-r^2)/(2R\cdot r))\ \psi=(\pi/2)-\Phi=(\pi/2)-\cos^{-1}(-(R_0^2-R^2-r^2)/(2R\cdot r)) \quad (1)$$

Based on the equation (1), the relationship between the location of the magnetic head on a magnetic disk, that is, length r, and the arm inclination angle, when the arm length (R) is a parameter, is shown in FIG. 4. This figure shows an example where the track radii r of the innermost periphery and the outermost periphery are 15 mm and 30 mm, respectively, and the distance ($R_0$) between the rotation center of the arm and the center of the magnetic disk 40 mm. The arm length is varied in a range between 30 mm and 50 mm.

As can be seen from FIG. 4, with fixed innermost and outermost circumferences, when the arm length is small, the arm inclination angle fluctuation amount within a range between the innermost and outermost circumferences. When the arm length is increased, the arm inclination angle itself increases; however a point where the arm inclination angle variation amount becomes minimum, appears. When the arm length is further increased, the arm inclination angle is further increased, and the arm inclination angle fluctuation amount once again recovers its increasing tendency. FIG. 5 shows the relationship between the arm length and the arm inclination angle fluctuation amount (difference between the maximum value and minimum value) in the case where the range is set the same as in FIG. 4 (15 mm≦r≦30 mm). That is, when a range between the innermost and outermost circumferences is set, an arm length (R) with which the arm inclination angle fluctuation amount becomes minimum is in a region larger than $R_0$. Therefore, by setting such an arm length, the track misregistration can be minimized.

Table 1 presents the optimum value ($R_{opt}$) of the arm length (R) where a distance ($R_0$) between the center of the magnetic disk and the rotation center of the arm, a radius of innermost circumference ($R_{in}$) and a radium of outermost circumference are given, and Table 2 presents an arm inclination angle fluctuation amount. It should be noted that all of the radius of the innermost circumference ($R_{in}$), the radius of the outermost circumference ($R_{out}$) and the arm length (R) are standardized with reference to the distance ($R_0$) between the center of the disk and the rotation center of the arm, being as 1.

TABLE 1

Optimal Actuator Length ($R_{opt}$)

| $R_{in}$ / $R_{out}$ | 0.10 | 0.15 | 0.20 | 0.25 | 0.30 | 0.35 | 0.40 | 0.45 | 0.50 |
|---|---|---|---|---|---|---|---|---|---|
| 0.60 | 1.03 | 1.04 | 1.06 | 1.07 | 1.09 | 1.10 | 1.11 | 1.13 | 1.14 |
| 0.65 | 1.03 | 1.05 | 1.06 | 1.08 | 1.09 | 1.11 | 1.12 | 1.14 | 1.15 |
| 0.70 | 1.03 | 1.05 | 1.07 | 1.08 | 1.10 | 1.21 | 1.13 | 1.15 | 1.16 |
| 0.75 | 1.04 | 1.06 | 1.07 | 1.09 | 1.11 | 1.12 | 1.14 | 1.16 | 1.17 |
| 0.80 | 1.04 | 1.06 | 1.08 | 1.10 | 1.11 | 1.13 | 1.15 | 1.17 | 1.18 |
| 0.85 | 1.04 | 1.06 | 1.08 | 1.10 | 1.12 | 1.14 | 1.16 | 1.18 | 1.19 |
| 0.90 | 1.04 | 1.07 | 1.09 | 1.11 | 1.13 | 1.15 | 1.17 | 1.19 | 1.20 |
| 0.95 | 1.05 | 1.07 | 1.09 | 1.11 | 1.13 | 1.15 | 1.18 | 1.19 | 1.21 |
| 1.00 | 1.05 | 1.07 | 1.10 | 1.12 | 1.14 | 1.16 | 1.18 | 1.20 | 1.23 |

TABLE 2

Arm Inclination Angle Variation ($\Delta\Psi_{min}$(degree))

| $R_{in}$ / $R_{out}$ | 0.10 | 0.15 | 0.20 | 0.25 | 0.30 | 0.35 | 0.40 | 0.45 | 0.50 |
|---|---|---|---|---|---|---|---|---|---|
| 0.60 | 6.2 | 4.4 | 3.1 | 2.2 | 1.5 | 1.0 | 0.6 | 0.3 | 0.1 |
| 0.65 | 7.0 | 5.2 | 3.7 | 2.7 | 1.9 | 1.3 | 0.9 | 0.5 | 0.3 |
| 0.70 | 8.0 | 5.9 | 4.5 | 3.3 | 2.4 | 1.7 | 1.2 | 0.8 | 0.5 |
| 0.75 | 9.0 | 6.8 | 5.1 | 3.9 | 3.0 | 2.2 | 1.6 | 1.1 | 0.7 |
| 0.80 | 9.9 | 7.6 | 5.9 | 4.6 | 3.5 | 2.7 | 2.0 | 1.4 | 1.0 |
| 0.85 | 11.0 | 8.5 | 6.7 | 5.2 | 4.1 | 3.2 | 2.5 | 1.8 | 1.3 |
| 0.90 | 11.9 | 9.4 | 7.5 | 5.9 | 4.7 | 3.7 | 2.9 | 2.3 | 1.7 |
| 0.95 | 13.0 | 10.3 | 8.3 | 6.7 | 5.4 | 4.3 | 3.4 | 2.7 | 2.1 |
| 1.00 | 14.2 | 11.3 | 9.2 | 7.4 | 6.1 | 4.9 | 4.0 | 3.2 | 2.5 |

In the magnetic disk drive, when $D_{out}$ represents the outer dimension of the disk, $D_{out}/2<R_0$, and $R_{out}<D_{out}/2$; therefore $R_{out}<1$, is obtained. Further, the inner diameter of the disk ($D_{in}$) is determined by the size of the hole used for mounting a disk on the spindle motor. The radius of the innermost circumference ($R_{in}$) is usually in a region of $R_{in}>0.3$, which is obtained from the relationship, $R_{in}>D_{in}/2$. In order to maintain a large area for recording data, it is preferable that $R_{out}$ should be as large as possible and $R_{in}$ be as small as possible. $R_{out}$ and $R_{in}$ of an actual magnetic disk drive are determined in consideration of recording characteristics, contact-start-stop (CSS) zone security, a margin required by the mechanism portion, etc.; however in practice, each of $R_{out}$ and $R_{in}$ falls within the respective range as follows:

$$0.8<R_{out}<0.95,\ 0.3<R_{in}<0.45$$

In view of the skew angle fluctuation amounts illustrated in FIGS. 2A and 2B, it is understood that it is not preferable that $R_{in}$ should be made small by using a special disk having a small $D_{in}$ value for the purpose of increasing the data region. Specifically, as can be understood from Table 1, a preferable standardized arm length is located within a range of 1.1 to 1.2.

Thus, the magnetic head can be sought by optimizing the arm length to prepare a substantially constant skew angle on the magnetic disk.

An embodiment of the present invention will now be described by taking a 2.5-inch magnetic disk drive using a taper flat type slider, as an example. In this embodiment, the head flying height of the magnetic gap position in the case where the bearing inclination angle of the magnetic head is varied in different values, was analyzed, with the radii of the innermost and outermost circumferences of the data region of the 2.5-inch disk being set to 17 mm and 30.5 mm respectively.

Taper flat type slider

| | |
|---|---|
| Length of slider in longitudinal direction | 2.04 mm |
| Length of slider in width direction | 1.60 mm |
| Head load | 4 g |
| Crown | 40 nm |
| Camber | 10 nm |
| Flying height at innermost circumference of disk | 50 nm |
| Disk rotation number | 5400 rpm |
| Bearing inclination angle | 0°, 10°, 20°, 30°, |

Figure 6A:
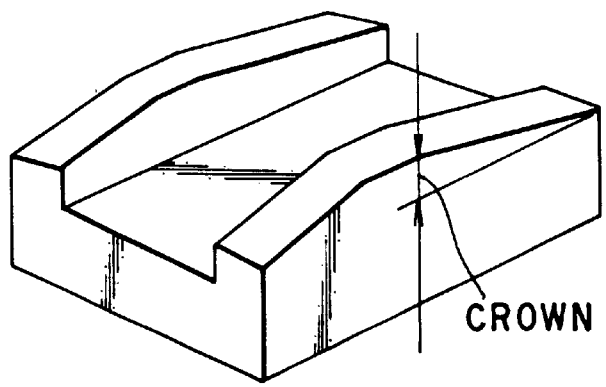
FIGS. 6A and 6B are explanatory views showing a crown and camber, respectively.
Figure 6A:
Figure 6B:
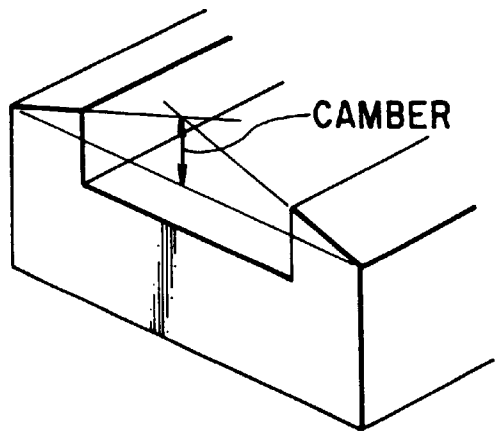
Figure 6B:
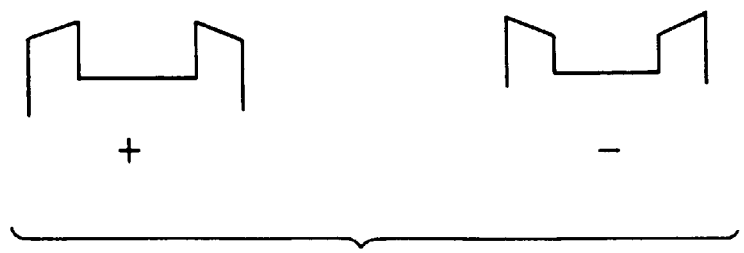

In order to achieve the uniformity of the flying height at 50 nm, a different slider bearing width is set for each of the various bearing inclination angles of the magnetic head. The crown is a value indicating the difference between the projection and recess of the bearing surface of the magnetic head slider with respect to the longitudinal direction (FIG. 6A), and the projection towards outside is taken as positive. The camber is a value indicating the difference between the projection and recess of the bearing surface of the magnetic head slider with respect to the width direction of the magnetic head (FIG. 6B), and the projection towards inside is taken as positive. The skew angle θ are set such that they are substantially at constant for both the inner and outer circumferences of a magnetic disk.

Figure 7:
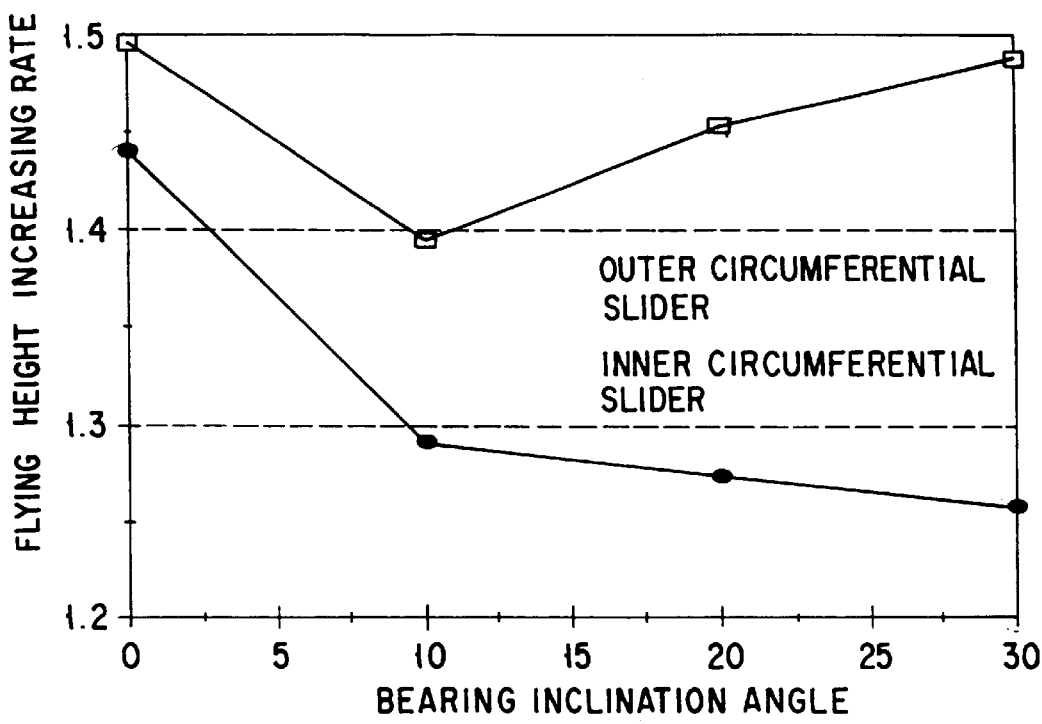
FIG. 7 is a diagram showing the result of an analysis for the flying height increasing rate of the magnetic head between the inner and outer circumferences of the magnetic disk (the ratio between the head flying height in the innermost circumference and that in the outermost circumference)

FIG. 7 shows the result of an analysis of the flying height increasing rate (the ratio of the head outflow end flying height for the outermost circumference to that for the innermost circumference) of the magnetic head for both inner and outer circumferences of the magnetic disk. In accordance with an increase in the bearing inclination angle α, the flying height increasing rate of the magnetic head decreases, and therefore it is understand that if the bearing inclination angle α is increased, the head flying height can be set substantially at constant for both inner and outer circumferences of the magnetic disk. As compared to a decrease in the flying height increasing rate of the inner circumference side outflow end of the slider, a decrease in the flying height increasing rate of the outer circumference side outflow end of the slider is very prominent, and therefore it is understood that the head flying height can be made further at constant by providing the magnetic gap in the vicinity of the outflow end of the outer circumference side bearing surface.

Figure 8:
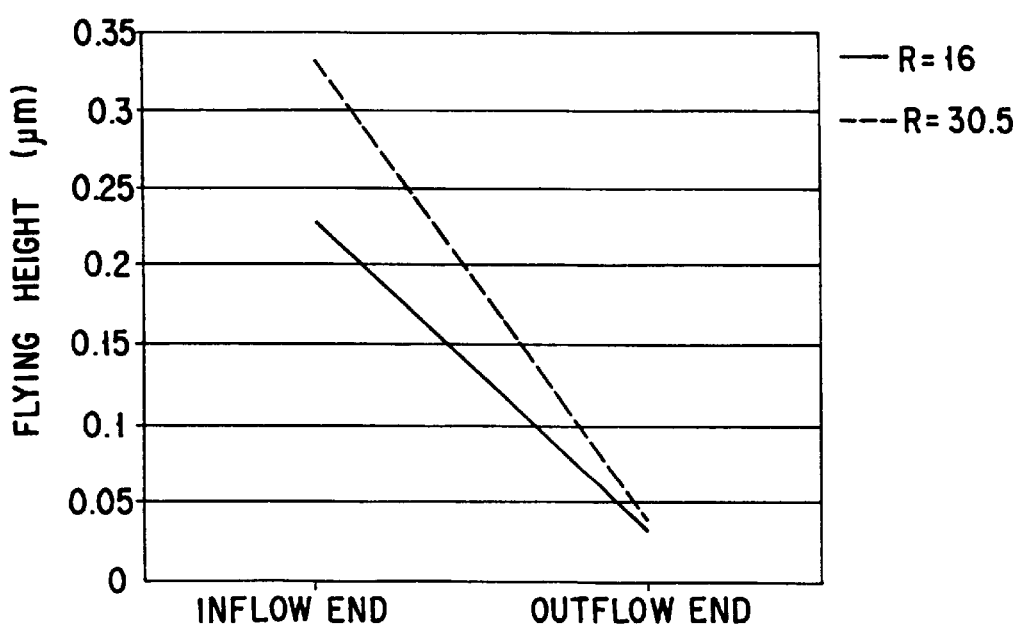
FIG. 8 is a diagram showing a flying attitude of the magnetic head slider.

FIG. 8 is a diagram showing a flying attitude (that is, the flying height at the inflow end and outflow end) in the case where the bearing inclination angle α is set at 20° under the same conditions. In this figure, the solid line illustrates a flying attitude for the innermost periphery of the magnetic disk, and the broken line illustrates a flying attitude for the outermost circumference. From this figure, it is understood that the head flying height of the outer circumference outflow side of the magnetic head slider having a magnetic gap does not substantially vary between the inner and outer circumferences of the magnetic disk. The description of the reason for causing such a result will not be repeated.

It is understood from the analysis result shown in FIG. 7 that the flying height increasing rate of the magnetic head along with an increase in the bearing inclination angle α tends to converge to a constant value while decreasing. For example, for a bearing inclination angle of 20° to 30°, the fluctuation amount of the flying attitude does not substantially change.

In consideration of influences caused by size of the magnetic head, a shape error, a circumferential speed and the like, which determine the flying attitude of the magnetic head slider, it is considered that some problem occurs if the inclination angle of the magnetic head slider for an air flow is excessively increased. It is known from the error analysis of the head flying height that, for example, in the case where a bearing inclination angle is set, the fluid spring constant decreases as compared to the case where the bearing inclination angle is 0°, and the amount of the fluctuation of the flying attitude due to the influence of the shape error or change in the circumference, is increased. In order to achieve a certain stability of the flying attitude of the magnetic head slider, the bearing inclination angle should be limited to about 30° or less. As described, in order to achieve the advantage of the present invention in the effective way, the bearing inclination angle α defined between the rotating direction of the magnetic disk and the disk outer circumference side axis, should be set to 30° or less.

FIG. 9 is a graph showing the flying height increasing rate of the outer circumference side slider, the change in the flying height error analysis along with various bearing inclination angles, and the product thereof. In this graph, the flying height increasing rate is expressed with respect to the case where the bearing inclination angle α is 30° standardized as 1, whereas the error analysis is expressed with respect to the case where the bearing inclination angle α is 0° standardized as 1. The flying height error analysis is based on the flying height increasing rate due to the fluctuation of the parameter in the outer periphery side of the disk.

It is considered from this graph that the minimum value of the bearing inclination angles obtained by multiplying the two calculation results should be used for the optimum design, and in the case of the magnetic head slider used for this figure, α=5°–20°.

For the purpose of further decreasing the change in the head flying height as compared with changing the above conditions, the calculation was carried out with difference values of the crown. The flying height increasing rate at a bearing inclination angle of 20° was found to change as follows:

Crown of 40 nm: 1.27
Crown of 50 nm: 1.24

With the above results, it is considered that the head flying height can be made constant by increasing the crown value. However, when the crown value becomes excessively large in the inner circumference side of a magnetic disk, that is, in the case of a small head flying height and small pitching angle, it is possible that the minimum flying height of the magnetic head cannot be obtained in the vicinity of the outer circumference side outflow end of the magnetic head slider, which the magnetic gap position. Therefore, the value of the crown must be set in full consideration of the minimum flying height of the magnetic head and the pitching angle.

Further, the calculation was carried out with an increase value of the camber. FIG. 10 is a graph illustrating the analysis result of the flying height increasing rate at the outflow end of the outer circumference side bearing of the magnetic head slider between the inner and outer circumferences of the magnetic disk. In this figure, in order to make the flying height in the innermost circumference of the disk evenly at 50 nm for both the inner and outer circumference sides, the pivot position, which is a supporting point of the magnetic head slider, is shifted. In accordance with an increase in the size of camber, the flying height increasing rate of the head decreases, and therefore it is considered that the head flying height both for the inner and outer circumferences of the magnetic disk can be made substantially constant. This effect of making the flying height at constant by increasing a camber is created by the synergistic effect of the following two factors.

(1) As the circumferential speed ratio between the inner and outer circumferential sides decreases, the flying height of the inner circumference side relatively increases.

(2) In accordance with a reduced influence of the camber, the influence of the pivot shift increases.

Therefore, as the camber enlarges, the pivot moves to the outer circumference side of the magnetic head, thereby enhancing the flying height constant effect. However, the camber is formed along with the crown, and therefore the value of the crown is very important. In consideration of this, the range of the setting of the camber at a flying height of 50 nm, should be set at 40 nm or less.

Figure 11:
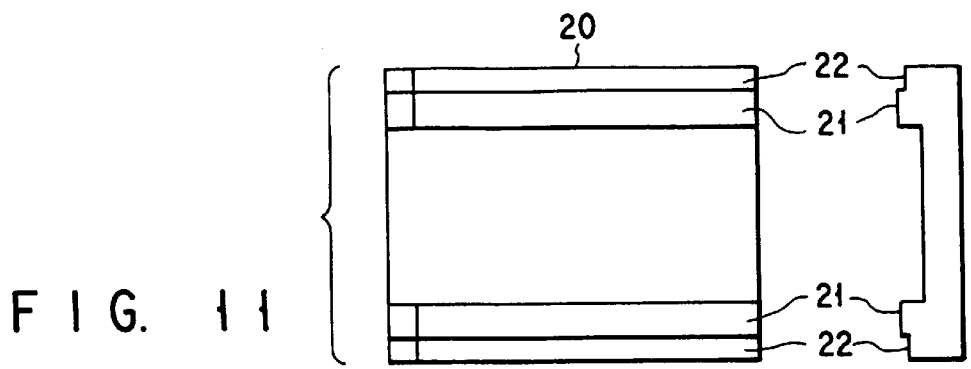
FIG. 11 is a diagram for explaining the shape of the head having steps.

Further, an analysis of a head in which steps, which is expected to have the same effect as the camber, are formed on the outer side of the bearing of a conventional taper flat slider, is carried out. The calculations were conducted with respect to a slider in which steps were formed only in the inner circumference side bearing, a slider in which steps were formed only in the outer circumference side bearing, and a slider in which steps were formed in the bearings of both the inner and outer circumference sides. FIG. 11 illustrates the shape of a slider 20 in which steps 22 are provided in both bearings 21, as a typical example. In these calculations, the pivot was not shifted, but the widths of the bearings of the inner and outer circumferences were changed. The calculation conditions were as follows:

Slider with steps

| | |
|---|---|
| Length of slider in longitudinal direction | 2.04 mm |
| Length of slider in width direction | 1.60 mm |
| Head load | 4 g |
| Crown | 0 nm |
| Camber | 0 nm |
| Flying height at innermost circuinference of disk | 50 nm |
| Bearing inclination angle | 20° |
| Disk rotation number | 5400 rpm |
| Step width | 100 μm |
| Step depth | 0.1 μm |

The results of the flying height increasing rate of the sliders having the steps were as follows:

| | |
|---|---|
| Slider in which steps were formed in the inner circumference side bearing: | 1.15 |
| Slider in which steps were formed in the outer circumference side bearing: | 1.28 |

Slider in which steps were formed in the bearings of both the inner and outer circumference sides: 1.28

With the above results, it can be understood that a more prominent flying height constant effect is exhibited when the steps are provided only in the inner circumference side bearing.

Figure 12:
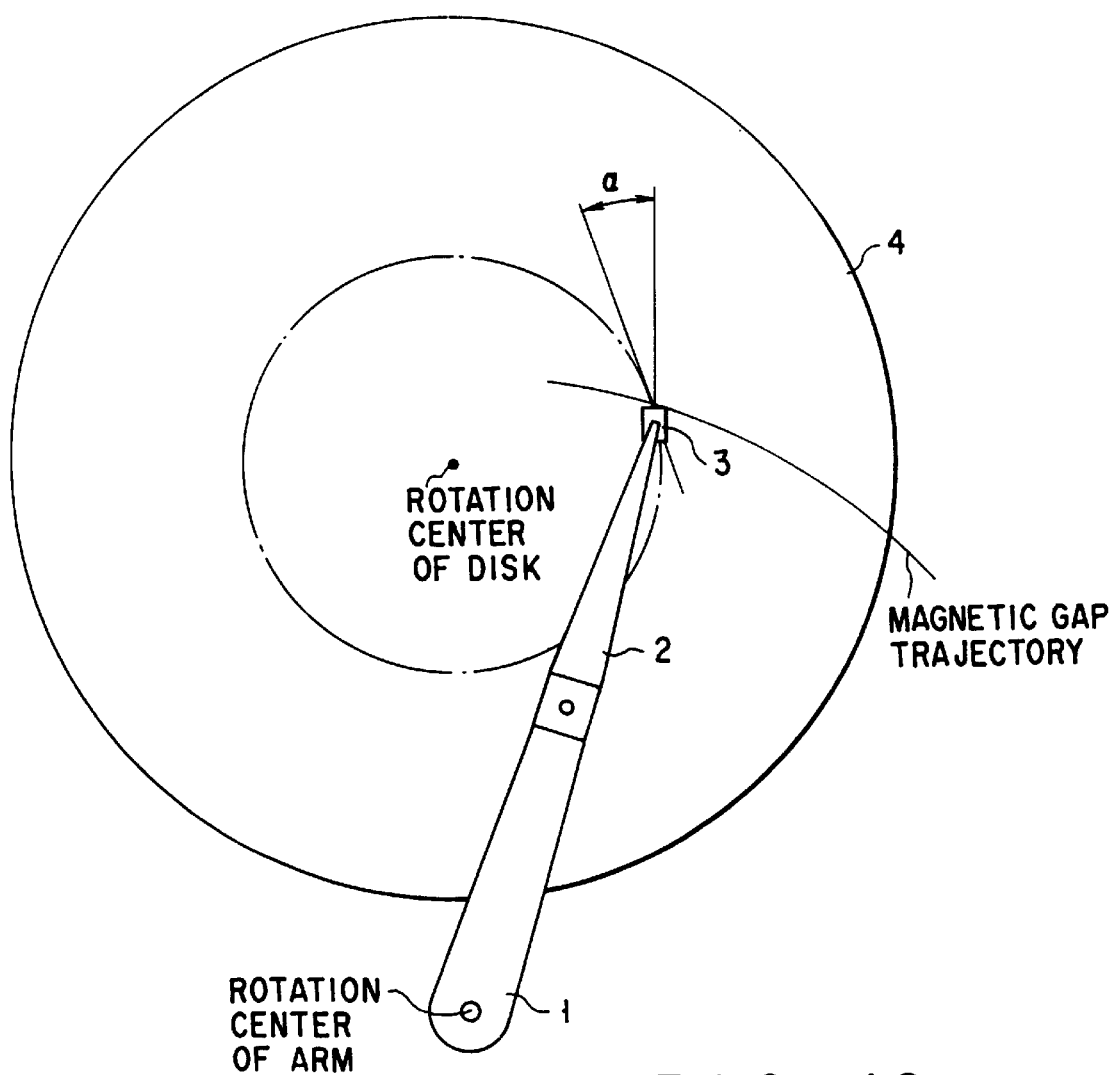
FIG. 12 is a schematic view showing a magnetic disk drive according to the first embodiment of the present invention.

The first embodiment of the magnetic disk drive according to the present invention will now be described with reference to FIG. 12. FIG. 12 is a perspective view showing the magnetic disk drive according to the first embodiment of the present invention.

A suspension 2 is mounted at the tip end of an arm 1 which constitutes a rotary actuator, and a magnetic head slider 3 mounted a magnetic head in which writing/reading elements are separately provided, is mounted on an end of the suspension 2. As the arm 1 is rotated around its rotation center, the magnetic head slider 3 is moved in the radial direction of a magnetic disk 4. While moving the head, the magnetic head 3 is arranged to be inclined with respect to the suspension 2 by a predetermined degree such that the bearing inclination angle α of the magnetic head slider falls within the above range and the skew angle θ is made substantially constant for both the inner and outer circumferences of the magnetic disk. Thus, even in the case where the variation of the skew angle between the inner and outer circumferences of the magnetic disk is small, the head flying height can be made substantially constant. Consequently, in the magnetic disk drive having a magnetic head in which writing/reading elements are separately provided, the CDR method, which is capable of enhancing the recording capacity by 30% as compared to the conventional technique, can be employed.

FIG. 13 is a perspective view of a magnetic disk drive according to the second embodiment of the present invention. In the following description, the same structural elements as those shown FIG. 12 or those having the same functions are designated by the same reference numerals, and the explanations thereof will not be repeated.

In the second embodiment, a suspension 2 on which a magnetic head 3 is mounted, is arranged to be inclined with respect to an arm 1 by a predetermined degree such that the skew angle θ of the magnetic head falls within the above range and is made substantially constant for both the inner and outer circumferences of a magnetic disk. With the structure just mentioned, the same effect as that of the first embodiment can be obtained.

FIG. 14 is a perspective view of a magnetic disk drive according to the third embodiment of the present invention. In this embodiment, a certain skew angle can be given by adjusting the relative arrangement between an entire rotary actuator and a magnetic disk 4 without inclining a magnetic head 3 or suspension 2. With the structure just mentioned, the same effect as that of the first embodiment can be obtained.

FIGS. 15A and 15B are diagrams showing structures of the magnetic head slider applicable to the magnetic disk drives according to the first to third embodiments of the present invention.

In the first to third embodiments, if it is difficult to set a certain bearing inclination angle α due to the structure of the entire drive, the length direction of the bearing may be inclined at, for example, an angle of β with respect to the length direction of the magnetic head slider as shown in FIG. 15A, or the bearing inclination angle may be adjusted to a predetermined value by deforming the magnetic head slider itself as shown in FIG. 15B, thus achieving the structure according to the present invention. As mentioned above, the bearing inclination angle is set as an angle of the outer circumference axis with respect to the rotating direction of a magnetic disk, and set to a desirable value (i.e. bearing inclination angle).

For the purpose of clarifying the definition of the bearing inclination angle, an explanation with reference to two heads having arbitrary shapes will be provided. In FIGS. 16A and 16B, the bearing inclination angle is defined as an angle between a direction of the line obtained by approximating the drawn center of slider width direction and an air flow direction. With this definition, the invention can be applied to a slider having an arbitrary shape.

FIG. 17 is a perspective view showing the fourth embodiment of the magnetic head slider applied to the magnetic disk drive according to the present invention.

At the inflow end side of the flying surface provided to oppose to the magnetic disk surface, a taper 32a which is one part of the ascending mechanism is situated, and a flat portion 32b, to which a dynamic pressure is created by the rotation of a magnetic disk, follows. Hereinafter, the combination of the taper 32a and flat portion 32b is called a air bearing surface portion 32. On the outflow edge side of the air bearing surface portion 32, a non-air bearing surface portion 33 on which a dynamic pressure caused by the rotation of the magnetic disk is not substantially generated, is provided. A writing/reading element 34 is situated to run from the rear end of the air bearing surface portion 32 through the non-air bearing surface portion 33 to the end surface of a pad portion 35 located on the outflow edge side.

With the magnetic head slider 31 having the above-described shape, and the arrangement of the writing/reading element 34, during the rotation of a magnetic disk at a constant speed, the flying attitude varies as shown in FIG. 18 between the inner and outer circumferences, even if the skew angle does not substantially changes, and gaps ($S_{in}$, $S_{out}$) between the writing/reading element 34 and the magnetic disk 36 do not substantially vary between the inner and outer circumferences of the magnetic disk 36. With regard to the variation of the flying attitude of the magnetic head slider 31, the flying attitude varies in the direction in the entire magnetic head slider 31 moves away from the magnetic disk 36 as the relative speed increases from the inner circumference towards the outer circumference, or in the direction in which the inflow edge side of the magnetic head slider 31, where the dynamic pressure bearing surface portion 32 is situated, moves further away from the disk as compared to the outflow edge side, that is, the direction in which so-called pitching angle $\phi$ increases. Therefore, with a combination of the variations in the above two directions, the characteristics in which a gap between the magnetic disk 36 and the writing/reading element 34 located in the outflow edge side of the dynamic pressure bearing surface portion 32, which is practically a dynamic pressure generating surface, and at the end portion of the pad portion 35 which generates a small dynamic pressure, that is, head spacing, does not very much change, can be obtained.

The processing the magnetic head slider 31 according to the embodiment shown in FIG. 17 is not at all difficult as compared to the processing of the conventional taper flat slider, and the production cost is not increased. More specifically, the magnetic head slider 31 can be manufactured easily by performing the same groove processing, which is carried out conventionally in the longitudinal direction, on a conventional taper flat slider in the direction which normally crosses with the longitudinal direction thereof.

The inventors carried out a flying characteristic analysis with respect to the shape of the magnetic head slider shown in FIG. 17, with a constant size of the entire slider (length 2 mm and width 1.5 mm) and a parameter set for various lengths. A 2.5-inch magnetic disk drive is taken as an example, with a recording region innermost radius of 16 mm, a recording region outermost radius of 30.5 mm, a disk rotation number of 5400 rpm, a press load of 4 gf, and the center of the load being located at a position of 57.5% with respect to the length (L1) of the front bearing portion. As regards the shape of the magnetic head slider, the center of the load should preferably be located between 55% and 65% from the front of the slider, in consideration of the flying height variation rate and flying stability. The retreating amount of the surface of the non-air bearing surface from the surface of the air bearing surface was set at 50 $\mu$m in this analysis, although its sufficient amount is only 10 $\mu$m. The width of each air bearing surface was adjusted such that the spacing at the innermost circumference is 50 nm.

The dimensions used as the parameters of the shape of five different types of magnetic head sliders A to E employed in the analysis will be listed. The sections represented by the symbols are shown in FIG. 17.

|   | L1(mm) | L2(mm) | L3(mm) |
|---|--------|--------|--------|
| A | 1.2    | 0.8    | 0.2    |
| B | 1.4    | 0.6    | 0.2    |
| C | 1.6    | 0.4    | 0.2    |
| D | 1.4    | 0.6    | 0.1    |
| E | 1.4    | 0.6    | 0.3    |

FIG. 19 shows the result of the analysis of the flying height (head spacing) of the writing/reading element at each position of the recording region of a magnetic disk, with regard to five types of magnetic head sliders. The flying height varies from the inner circumference of the magnetic disk to the outer circumference substantially in a linear manner. It is consequently understood from the result that the flying height increasing rate (the ratio of the flying height in the innermost circumference with respect to that in the outermost circumference) decreases, as the length (L2) from the beginning portion of the non-air bearing surface portion 33 to the magnetic gap portion of the writing/reading elements 4 situated in the pad portion 35, increases. Further, it is made clear that as the area of the surface opposing to the magnetic disk in the rear of the air bearing surface portion 32 decreases, the flying height increasing rate decreases.

However, the length (L2) from the beginning portion of the non-air bearing surface portion 33 to the magnetic gap portion of the writing/reading elements 4 situated in the pad portion 35, is large, or the area of the surface opposing to the magnetic disk in the rear of the air bearing surface portion 32 is significantly small as compared to the area of the air bearing surface portion 32, the following problem in terms of reliability occurs.

A magnetic disk, which is fixed to the spindle motor, may be deformed, depending on how the disk is fixed thereto. With a recent technology, a very slight deformation of the fine head spacing causes a variation of the spacing. FIG. 20 is a schematic diagram showing the status of the magnetic head slider 41 running on a magnetic disk 10 which is warped in the circumferential direction.

In the case of the conventional head slider 41a which is illustrated by the solid line, which does not have a non-air bearing surface in which no dynamic pressure is substantially generated, the rigidity of the fluid-film bearing is high all over the slider, and the flying position with respect to an average plane is maintained. When the magnetic gap of the writing/reading elements is provided at the rear end of the magnetic head slider 41, the magnetic head spacing variation with respect to the magnetic disk having no warp is $\Delta h1$. In the case of the magnetic head slider 41b having a non-air bearing surface and illustrated by the broken line, the front side bearing dominantly operates, maintaining the flying attitude with respect to an average plane n, and therefore the head spacing variation much increases as high as $\Delta h2$. The manner of such an increase depends on the length from the beginning portion of the non-air bearing surface 43 to the magnetic gap portion of the writing/reading elements situated in the pad portion 44.

The following are the results of the calculation of the maximum spacing variation rate ($\Delta h2/\Delta h1$) as regards a magnetic disk which is warped in its circumferential direction, with a parameter of the ratio ($\gamma$) of the length from the beginning portion of the non-air bearing surface 43 to the magnetic gap portion of the writing/reading elements situated in the pad portion 44, with respect to the length of the dynamic pressure bearing in the front side of the magnetic head slider, with reference to a general magnetic head slider which does not have a non-air bearing surface.

| γ(L2/L1) | Δh2/Δh1 |
|---|---|
| 1/5 | 2.1 |
| 1/4 | 2.4 |
| 1/3 | 2.7 |
| 1/2 | 3.2 |
| 1 | 4.4 |

The method of fixing a magnetic disk to a spindle motor has been improved significantly in accordance with a progress in technology; however there is still a demand of enhancing the anti-shock property as for the magnetic disk drive, and the fastening force must be increased. At a present situation, the minimum radius of curvature in the circumferential direction is about 2 m for the innermost circumference of a disk. For the warp having the same radius of curvature, the spacing variation ($\Delta h1$) becomes smaller as the length of the whole slider is shorter. For example, in the case of a slider having an entire length of 2 mm, $\Delta h1$ is calculated about 0.012 μm, for a radius of curvature of 2 m. The head spacing of the conventional disk drive is less than 0.1 μm, and the allowance limit of the head spacing variation ($\Delta h2$) in the magnetic head slider having a non-air bearing surface is about 3 times as much as $\Delta h1$. If the head spacing variation exceeds this allowance limit, the product device cannot be used in practice. The ratio ($\gamma$) of the length from the beginning portion of the non-air bearing surface 43 to the magnetic gap portion of the writing/reading elements situated in the pad portion 44, with respect to the length of the dynamic pressure bearing 45 in the front side of the magnetic head slider, should be ½ or less. This ratio does not vary when the slider length is small and the head spacing is small, and therefore the above relationship can be basically established. The ratio ($\gamma$) is limited by the area of the pad portion 44 or the like, the lower limit is set in accordance with the shape of the magnetic head slider.

In the case of a magnetic disk drive which employs the CSS method which starts and stops a disk from the contact state, the above-described spacing variation promotes damages to the magnetic head at the start and stop of the disk, thereby significantly deteriorating the CSS durability. Further, in the case where the area of the pad portion in which the writing/reading elements on the rear side, is small, an experimental result, to which the damage of the pad portion is remarkable, is obtained.

With regard to the magnetic head slider having a γ value of 0.37 (L1=1.46, L2=0.54), the sliding experiment with two sliders respectively having different ratio ($\delta$=1/12 and $\delta$=1/17) of the area of the pad portion 35 with respect to the area of the air bearing surface portion 32 were made. No damage was observed in the former slider ($\gamma$=1/12). A considerable damage was observed in the latter slider ($\delta$=1/17). Therefore, the lower limit of a is considered as in a range of equal to or more than 1/17 and equal to or less than 1/12.

In the main object of the present invention, where the variation of the skew angle is not provided, with a decrease in the flying height variation rate between the inner and outer circumferences of a magnetic disk, the value a is further limited, and when it is more than 1/5, the flying height variation rate exceeds 1.2. Consequently, the employment of the CDR is not very much effective.

When the length from the beginning portion of the non-air bearing surface to the magnetic gap portion of the writing/reading elements situated in the pad portion is set ½ or less of the length of the dynamic pressure bearing in the front side of the magnetic head slider, and the area of the pad portion in which the writing/reading elements are mounted is set 1/5 or less of the area of the air bearing surface provided in the front side, the spacing variation between the inner and outer circumferences in the recording area can be made small, while maintaining a reliability, thus enabling a high density writing/reading.

With an overall examination of the above contents, the allowable ranges for the measurements shown in FIG. 17 in the present invention, in consideration of both characteristics of the flying height increasing rate and CSS durability are as follows:

L2/L1<½

L3/L1<1/5

This embodiment was described in connection with the shape having a groove which normally crosses with the length direction of the magnetic head slider 31; however the groove does not always cross normally with the longitudinal direction of the slider. There can be provided a groove which inclines towards the length direction of the magnetic head slider 31 can be provided in order to control the right-left flying balance, for example, the rolling amount of the right and left sliders caused by a difference in circumferential speed between the inner and outer circumferences of the magnetic disk, or to prevent damages to the writing/reading elements 34 of the magnetic head in CSS.

Modifications of the magnetic head slider applied to the magnetic disk drive of the present invention will now be described with reference to FIGS. 21, 22 and 23. Throughout FIGS. 21 to 23, the same structural elements as those shown FIG. 17 or those having the same functions are designated by the same reference numerals, and the explanations thereof will not be repeated.

Recently, the patterning technique which employs the photolithography technique which was developed in the semiconductor manufacture technique as a processing technique of a magnetic head slider, and the etching technique in a dry circumstance are beginning to be applied. Since these techniques are used in combination with a conventional mechanical process, the production cost is somewhat increased; however the degree of freedom in selecting the shape of the slider bearing surface is remarkably increased.

FIG. 21 is a perspective view showing the first modification of the magnetic head slider according to the present invention.

In this modification, the writing/reading element 34 is situated substantially at the center of the magnetic head slider 31 with respect to its width direction. With this structure, the characteristics in which the flying height of the writing/reading element 34 does not change even if the variation in the rolling direction occurs due to the vibration and shock of external disturbance applied to the magnetic head slider 31 while flying, can be obtained, and therefore the head spacing variation can be suppressed to a small level. In this version also, the area of the surface opposing to the magnetic disk of the pad portion 35 having an end surface in which the writing/reading element 34 is provided, should be made small. In consideration of both characteristics, i.e. the flying height increasing rate between the inner and outer circumferences of a magnetic disk and the CSS durability, the area of the pad portion 6 should preferably set 1/5 or less with respect to the area of the air bearing surface portion 32.

FIG. 22 is a perspective view showing the second modification of the magnetic head slider according to the present invention.

In this modification, the surface opposing to a magnetic disk of the pad portion 35 in which the writing/reading element 34 is provided, is made to have a shape close to a semi-ellipse without sharp edges for the purpose of improving the CSS durability. The rear ends of the right and left dynamic pressure bearings 32 are not shaped into linear, and have a curved surface sloped with respect to the direction normally crossing with the length direction of the magnetic head slider 31. In the magnetic head slider having such a sloped rear end shape, a substantial flying force does not occur until the last end of the dynamic pressure bearing. In the case of such a sloped rear end shape, the starting portion of the non-air bearing surface portion 33 in which a dynamic pressure is generated, is located at the center portion of the sloped line as indicated by the two dot chain line in FIG. 22.

FIG. 23 is a perspective view showing the third modification of the magnetic head slider according to the present invention.

As in this modification, the non-air bearing surface portion 33 can be continuous to the air bearing surface portion 32 on the front side and the pad portion of the rear side, and it only suffice if a section in which a dynamic pressure is not substantially generated is made. In this version, the starting portion of the non-air bearing surface portion 33 and the starting portion of the pad portion in which the writing/reading element is mounted, have a sloped shape in similar to the starting portion of the non-air bearing surface portion 33 of the second modification, and the starting portion is located at the center portion of the sloped line as indicated by the two dot chain line in FIG. 23.

As described above, with the etching process in which the photolithography technique is used, the slider surface can be made into an arbitrary shape. Therefore, according to the fourth embodiment of the present invention, in the magnetic head slider in which writing/reading elements are separated provided, which is the basic concept of the present invention, a section in which a substantial dynamic pressure is not generated between the center and rear end of the slider, is provided, and the writing/reading element is mounted in the rear pad portion. With this structure, even if the skew angle change between the inner and outer circumferences is set small, it is only natural that the shape of the slider which can reduce the spacing variation with respect to the relative speed change between the inner and outer circumferences, may be arbitrary.

A program at recording with a skew angle and countermeasure thereto will be explained. Recording with the skew angle increase side fringing recording section at especially one track edge by edge effect at both track edges of the writing element. Therefore, since invalid recording area increases, it makes obstruction of high track density. The fifth embodiment according to the invention to solve above obstruction will be explained.

The fifth embodiment is not limited to the separation type or integrated type of a writing/reading head, and has such a structure that all the portion of, at least, the magnetic pole of the writing head (to be called simply "magnetic pole" hereinafter) opposing to a recording magnetic disk is located within an area scanned by the trailing edge, for the purpose of softening the edge effect.

The trailing edge is a gap edge portion of consequently forming writing track on the magnetic disk in two gap edge portions on the air bearing surface forming magnetic gap of the writing element opposite to the magnetic disk.

Figures 24A, 24D:
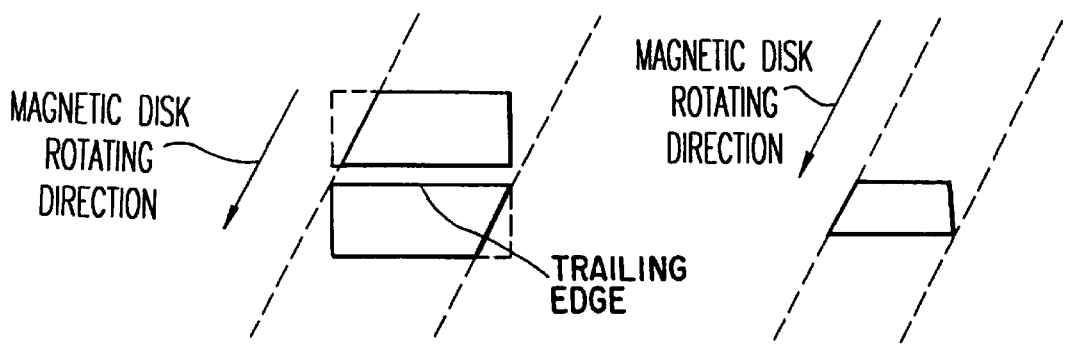
Figures 24B, 24E:
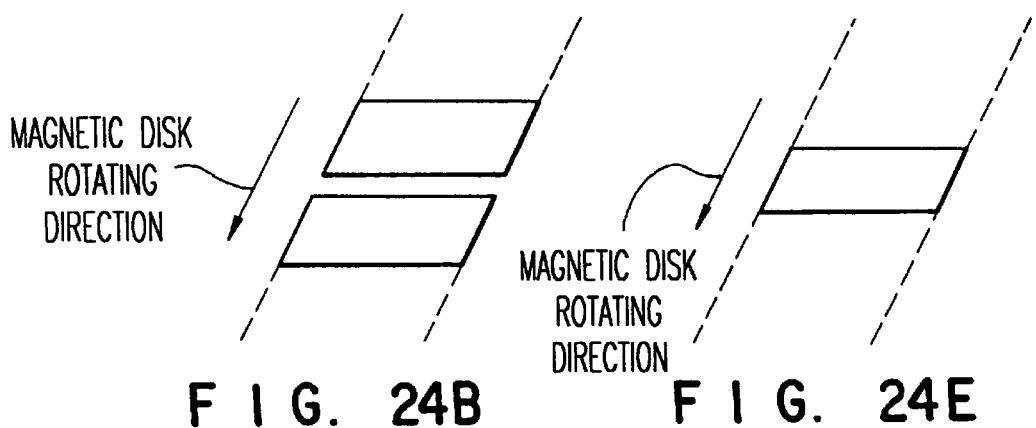
Figures 24C, 24F:
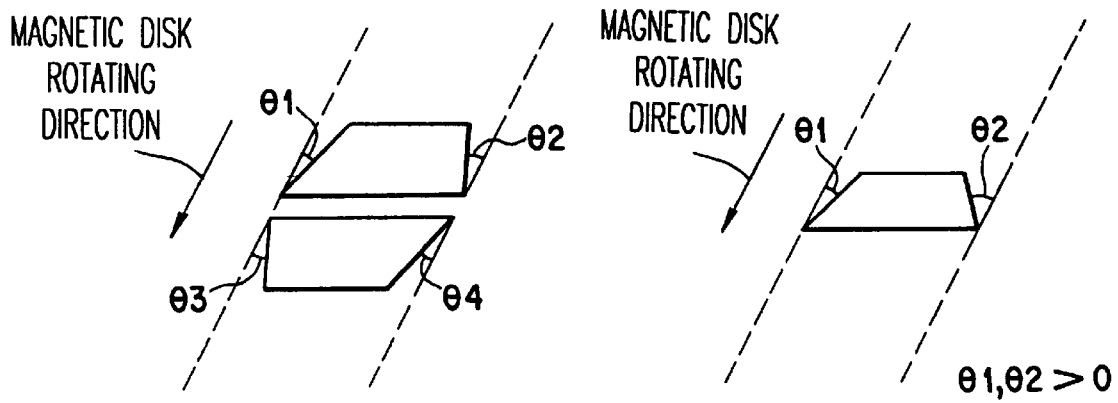

FIGS. 24A to 24C are diagrams showing the shapes of the magnetic poles opposite to the magnetic disk according to the present invention relating to ring-type head. In FIGS. 24A to 24C, the broken lines indicate a rotating direction (that is, a region scanned by the trailing edge), the solid lines illustrate the shapes of edges of magnetic poles, and the dot lines illustrate the shape of a general magnetic pole.

As illustrated in FIG. 24A, magnetic poles are usually rectangular having portions indicated by the dot lines; however in this case, the edge effect occurs, and invalid recording regions are created as indicated by the dot lines. The presence of such invalid regions blocks an increase in the track density. By removing the dot line regions, the edge effect can be reduced, improving the recording characteristics.

FIG. 24B shows not the case where a portion of a rectangular is removed as in FIG. 24A, but the case where a magnetic pole is formed into a parallelogram having sides in parallel with the rotating direction. With this structure, the edge effect is reduced, and a good recording characteristic can be achieved.

FIG. 24C is a diagram showing a magnetic pole having a structure in which a variation of the skew angle is taken into consideration. The structure shown in this figure is widely used. As can be seen in FIG. 24C, both sides connected to the trailing edge are arranged at a smaller angle than the angle made between the trailing edge and the rotating direction. With this structure, even if the skew angle varies as the head moves from the inner circumference to the outer circumference of a magnetic disk, the magnetic pole does not come out from the scanning region of the trailing edge (that is, tracking area), thereby achieving a good recording characteristic.

FIGS. 24D to 24F show shapes of magnetic poles relating perpendicular head according to the invention. The construction of each head is same as FIGS. 24A to 24C thereof. With this configuration, even if a such as changing of skew angle occurs, better recording characteristics can be obtained.

FIGS. 24G and 24H are embodiments to which magnetic pole shape opposite the magnetic disk according to the invention is applied to Merged-type head and Ingap-type head, respectively. The invention can be applied to any type of magnetic head which writing element portion opposite the magnetic disk is in a scanning area of the trailing edge, that is a basic concept of the invention.

Naturally, any of the above-discussed embodiments can be appropriately combined to prepare a modification of the present invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic disk drive for carrying out writing/reading information to/from a magnetic disk having a plurality of tracks including an innermost circumference track and an outermost circumference track, comprising:
   rotary actuator;
   magnetic head slider;
   a magnetic head unit-mounted on said magnetic head slider and comprising a magnetic gap structure; and
   a rotary actuator arm having a first end pivotally connected at a fixed pivot point to said rotary actuator and a second end connected to said magnetic head slider; wherein a length between said magnetic gap structure and said fixed pivot point is fixed and is set in a range of $1.1R_0$ to $1.2R_0$ where $R_0$ is a distance between a center of rotation of said magnetic disk and the fixed pivot point;

wherein:

said magnetic head slider includes an inflow end and an outflow end for a fluid flow generated by a rotation of said magnetic disk and further includes at least one bearing generating dynamic pressure by said fluid flow, and said magnetic head unit is provided close to said outflow end; and wherein said bearing of said magnetic head slider includes:

an air bearing surface in which a dynamic pressure is generated by fluid flow generated by the rotation of said magnetic disk;

a non-bearing surface, provided on a rear side of said air bearing surface, with respect to a rotating direction of said magnetic disk, in which a dynamic pressure is little generated; and a pad portion, provided on a rear side of said non-air bearing surface, with respect to a rotating direction of said magnetic disk, in which said magnetic head unit is mounted.

2. A magnetic disk drive for carrying out writing/reading information to/from a magnetic disk having a plurality of tracks including an innermost circumference track and an outermost circumference track, comprising:

rotary actuator;

magnetic head slider;

a magnetic head unit-mounted on said magnetic head slider and comprising a magnetic gap structure; and a rotary actuator arm having a first end pivotally connected at a fixed pivot point to said rotary actuator and a second end connected to said magnetic head slider; wherein a length between said magnetic gap structure and said fixed pivot point is fixed and is set in a range of $1.1R_0$ to $1.2R_0$ where $R_0$ is a distance between a center of rotation of said magnetic disk and the fixed pivot point;

wherein said magnetic head slider includes:

a front area, a middle area and a rear area, and said front area has an air bearing surface in which a dynamic pressure is generated by fluid flow generated by the rotation of said magnetic disk, said middle area has a non-air bearing surface, provided on a rear side of said air bearing surface, with respect to a rotating direction of said magnetic disk, in which less dynamic pressure is generated by the rotation of said magnetic disk, and said rear area has a pad portion, provided on the rear side of said non-air bearing surface, with respect to a rotating direction of said magnetic disk, in which said magnetic head unit is mounted.

3. A magnetic disk drive according to claim 2, wherein a skew angle is defined between a magnetic gap length direction of said magnetic gap and a rotating direction of said magnetic disk, and said skew angle is substantially 0° within a range between said innermost circumference track and said outermost circumference track.

4. A magnetic disk drive according to claim 2, wherein said pad portion includes a magnetic gap portion between said writing element and said reading element, and a length from a starting portion of said non-air bearing surface to said magnetic gap is ½ or less of a length of said air bearing surface.

5. A magnetic disk drive according to claim 4, wherein an area of said pad portion is ⅕ or less of an area of said air bearing surface.

6. A magnetic disk drive according to claim 2, wherein an area of said pad portion is ⅕ or less of an area of said air bearing surface.

7. A magnetic disk drive according to claim 2, wherein said magnetic gap structure comprises a reading element and a writing element, and said reading element is stacked with said writing element which is shifted from the reading element in a track width direction toward one of the outermost track and the innermost track, so as to compensate for a track misregistration due to an absolute value of said skew angle.

8. A magnetic disk drive for carrying out writing/reading information to/from a magnetic disk having a plurality of tracks including an innermost circumference track and an outermost circumference track, comprising:

rotary actuator;

magnetic head slider;

a magnetic head unit-mounted on said magnetic head slider and comprising a magnetic gap structure; and a rotary actuator arm having a first end pivotally connected at a fixed pivot point to said rotary actuator and a second end connected to said magnetic head slider; wherein a length between said magnetic gap structure and said fixed pivot point is fixed and is set in a range of $1.1R_0$ to $1.2R_0$ where $R_0$ is a distance between a center of rotation of said magnetic disk and the fixed pivot point;

wherein:

a bearing inclination angle is defined between said rotating direction of said magnetic disk and a longitudinal direction of a bearing surface of said slider, and said bearing inclination angle is in a range of 5–20°.

9. A magnetic disk drive according to claim 8, wherein a skew angle is defined between a magnetic gap length direction of said magnetic gap and a rotating direction of said magnetic disk, and said skew angle is substantially 0° within a range between said innermost circumference track and said outermost circumference track.

10. A magnetic disk drive according to claim 8, wherein:

said magnetic head slider includes an inflow end and an outflow end for a fluid flow generated by a rotation of said magnetic disk and further includes at least one bearing generating dynamic pressure by said fluid flow, and said magnetic head unit is provided close to said outflow end.

11. A magnetic disk drive according to claim 8, wherein a flying height of said magnetic head is substantially constant from said innermost circumference track to said outermost circumference track thereof.

12. A magnetic disk drive for carrying out writing/reading information to/from a magnetic disk having a plurality of tracks including an innermost circumference track and an outermost circumference track, comprising:

rotary actuator;

magnetic head slider;

a magnetic head unit-mounted on said magnetic head slider and comprising a magnetic gap structure; and a rotary actuator arm having a first end pivotally connected at a fixed pivot point to said rotary actuator and a second end connected to said magnetic head slider; wherein a length between said magnetic gap structure and said fixed pivot point is fixed and is set in a range of $1.1R_0$ to $1.2R_0$ where $R_0$ is a distance between a center of rotation of said magnetic disk and the fixed pivot point;

wherein said magnetic head slider includes an inflow end and an outflow end for a fluid flow generated by a rotation of said magnetic disk and further includes at least one bearing generating dynamic pressure by said fluid flow, and said magnetic head unit is provided close to said outflow end;

wherein:

a bearing inclination angle is defined between said rotating direction of said magnetic disk and a longitudinal direction of a bearing surface of said slider such that said outflow end is located on the outer circumferential side of said magnetic disk from said inflow end, with regard to said rotating direction of said magnetic disk.

13. A magnetic disk drive according to claim 12, wherein said bearing inclination angle is in a range of 5–20°.

14. A magnetic disk drive for carrying out writing/reading information to/from a magnetic disk having a plurality of tracks including an innermost circumference track and an outermost circumference track, comprising:

rotary actuator;

magnetic head slider;

a magnetic head unit-mounted on said magnetic head slider and comprising a magnetic gap structure; and a rotary actuator arm having a first end pivotally connected at a fixed pivot point to said rotary actuator and a second end connected to said magnetic head slider; wherein a length between said magnetic gap structure and said fixed pivot point is fixed and is set in a range of $1.1R_0$ to $1.2R_0$ where $R_0$ is a distance between a center of rotation of said magnetic disk and the fixed pivot point;

wherein said magnetic gap structure comprises a reading element and a writing element, and said reading element is stacked with said writing element which is shifted from the reading element in a track width direction toward one of the outermost track and the innermost track, so as to compensate for a track misregistration due to an absolute value of a skew angle defined between a magnetic gap length direction of said magnetic gap and a rotating direction of said magnetic disk.

* * * * *